US011494120B2

(12) United States Patent
Kumar et al.

(10) Patent No.: US 11,494,120 B2
(45) Date of Patent: Nov. 8, 2022

(54) ADAPTIVE MEMORY TRANSACTION SCHEDULING

(71) Applicant: QUALCOMM INCORPORATED, San Diego, CA (US)

(72) Inventors: Vikrant Kumar, Bangalore (IN); Karthik Chandrasekar, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 75 days.

(21) Appl. No.: 17/061,889

(22) Filed: Oct. 2, 2020

(65) Prior Publication Data

US 2022/0107753 A1 Apr. 7, 2022

(51) Int. Cl.
*G06F 3/06* (2006.01)

(52) U.S. Cl.
CPC .......... *G06F 3/0659* (2013.01); *G06F 3/0604* (2013.01); *G06F 3/0673* (2013.01)

(58) Field of Classification Search
CPC .... G06F 3/0659; G06F 3/0604; G06F 3/0673; G06F 7/14; G06F 11/3072; G06F 11/3409; G06F 11/3075
See application file for complete search history.

(56) References Cited

U.S. PATENT DOCUMENTS

| 2006/0248261 | A1 | 11/2006 | Jacob et al. |
| 2007/0156960 | A1* | 7/2007 | Vasudevan .......... G06F 12/0888 711/E12.021 |
| 2016/0124873 | A1 | 5/2016 | Xu et al. |

FOREIGN PATENT DOCUMENTS

EP 2450798 A1 5/2012

OTHER PUBLICATIONS

Copending and related PCT App. Ser. No. PCT/US2021/046575; filed Aug. 18, 2021; PCT International Search Report (ISR) & Written Opinion of the ISA conducted by the European Patent Office (EPO), dated Jan. 3, 2022; nine pages.

* cited by examiner

*Primary Examiner* — Gary W. Cygiel
(74) *Attorney, Agent, or Firm* — Smith Tempel Blaha LLC/Qualcomm

(57) ABSTRACT

Memory transactions in a computing device may be scheduled by forming subsets of a set of memory transactions corresponding to memory transaction requests directed to a DRAM. Each subset may include transactions identified by the same combination of direction (read or write) and DRAM rank as each other. The transactions selected for inclusion in each subset may be determined based on efficiency. One of the subsets may be selected based on a metric applied to each subset, and the transactions in the selected subset may be sent to the DRAM.

34 Claims, 15 Drawing Sheets

ADAPTIVE MEMORY TRANSACTION SCHEDULING

DESCRIPTION OF THE RELATED ART

Portable computing devices ("PCDs") are becoming necessities for people on personal and professional levels. These devices may include cellular telephones, tablet computers, palmtop computers, portable digital assistants ("PDAs"), portable game consoles, and other portable electronic devices. PCDs commonly contain integrated circuits or systems-on-a-chip ("SoCs") that include numerous components designed to work together to deliver functionality to a user. For example, an SoC may contain any number of processing engines, such as central processing units ("CPUs") with multiple cores, graphical processing units ("GPUs"), neural processing units ("NPU"s), digital signal processors ("DSP"s), wireless transceiver units (also referred to as modems), etc. An SoC may be coupled to other components within a PCD, such as a system memory. In a computing device, including but not limited to PCDs, memory transactions may be performed between the various processing engines and the system memory. The system memory in PCDs and other computing devices commonly comprises dynamic random access memory ("DRAM").

A processing engine may initiate writing data to or reading data from a system memory by requesting a write transaction or read transaction, respectively. A memory controller may translate such transaction requests from a processing engine into a memory transaction comprising a set of DRAM commands and associated data and target memory addresses. To meet DRAM timing constraints, a memory controller must space certain commands it provides to the DRAM chip by specified amounts or intervals of time. The cumulative effect of such timing intervals contributes to the latency or time required for a memory transaction to be completed. It is desirable to minimize memory transaction latency and improve memory access efficiency, because both have the potential to adversely impact computing device performance, and ultimately, the user experience.

A memory controller may handle multiple memory transaction requests that have been issued by multiple processing engines. The memory controller may receive additional memory transaction requests from one or more processing engines before transaction requests that the memory controller previously received have been completed. "Scheduling" is a term commonly used to refer to techniques employed to help balance the competing goals of meeting DRAM timing constraints while minimizing latency and maximizing DRAM efficiency. Broadly described, scheduling involves selecting the order or priority in which the memory controller sends transactions to the DRAM. Conventional memory transaction scheduling algorithms tend to be inflexible (statically defined) and do not dynamically adapt to characteristics of the transaction requests at runtime.

SUMMARY OF THE DISCLOSURE

Systems, methods, computer program products, and other embodiments are disclosed for scheduling memory transactions in a computing device. In exemplary embodiments, the computing device may include a memory controller coupled to a DRAM.

An exemplary method for scheduling DRAM transactions in a computing device may include determining a plurality of DRAM transactions corresponding to a plurality of transaction requests received from one or more processors. The exemplary method may further include forming subsets of the DRAM transactions. The exemplary method may still further include selecting one of the subsets. The exemplary method may yet further include sending all transactions in the selected subset to a DRAM. In determining the plurality of DRAM transactions, each DRAM transaction may be identified by a combination of whether the transaction is a read or a write and to which DRAM rank the transaction is directed. Each subset may comprise one or more DRAM transactions identified by the same combination of direction and DRAM rank as each other.

An exemplary system for scheduling DRAM transactions in a computing device may include a transaction queue and scheduling logic. The scheduling logic may be configured to determine a plurality of DRAM transactions corresponding to a plurality of transaction requests received from one or more processors. The scheduling logic may further be configured to form subsets of the DRAM transactions. The scheduling logic may still further be configured to select one of the subsets. The scheduling logic may yet further be configured to send all transactions in the selected subset to a DRAM. In determining the DRAM transactions, the scheduling logic may identify each transaction by a combination of whether the transaction is a read or a write or a write and to which DRAM rank the transaction is directed. Each subset may comprise one or more DRAM transactions identified by the same combination of direction and DRAM rank as each other.

Another exemplary system for scheduling DRAM transactions in a computing device may include means for determining a plurality of DRAM transactions corresponding to a plurality of transaction requests received from one or more processors. The exemplary system may further include means for forming subsets of the DRAM transactions. The exemplary system may still further include means for selecting one of the subsets. The exemplary system may yet further include means for sending all transactions in the selected subset to a DRAM. The means for determining the plurality of DRAM transactions in the exemplary system may identify each memory transaction by a combination of whether the transaction is a read or a write and to which DRAM rank the transaction is directed. Each subset may comprise one or more DRAM transactions identified by the same combination of direction and DRAM rank as each other.

An exemplary computer program product for scheduling DRAM transactions in a computing device may comprise a non-transitory computer-readable medium having instructions stored thereon in computer-executable form instructions that when executed by a processing system of a memory controller configure the memory controller to: determine a plurality of DRAM transactions corresponding to a plurality of transaction requests received from one or more processors; form subsets of the DRAM transactions; select one of the subsets; and send all transactions in the selected subset to a DRAM. In the exemplary computer program product a DRAM transaction may be identified by a combination of whether the transaction is a read or a write and to which DRAM rank the transaction is directed. Each subset may comprise one or more DRAM transactions identified by the same combination of direction and DRAM rank as each other.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

The word "exemplary" is used herein to mean "serving as an example, instance, or illustration." The word "illustrative" may be used herein synonymously with "exemplary." Any aspect described herein as "exemplary" is not necessarily to be construed as preferred or advantageous over other aspects.

Figure 1:
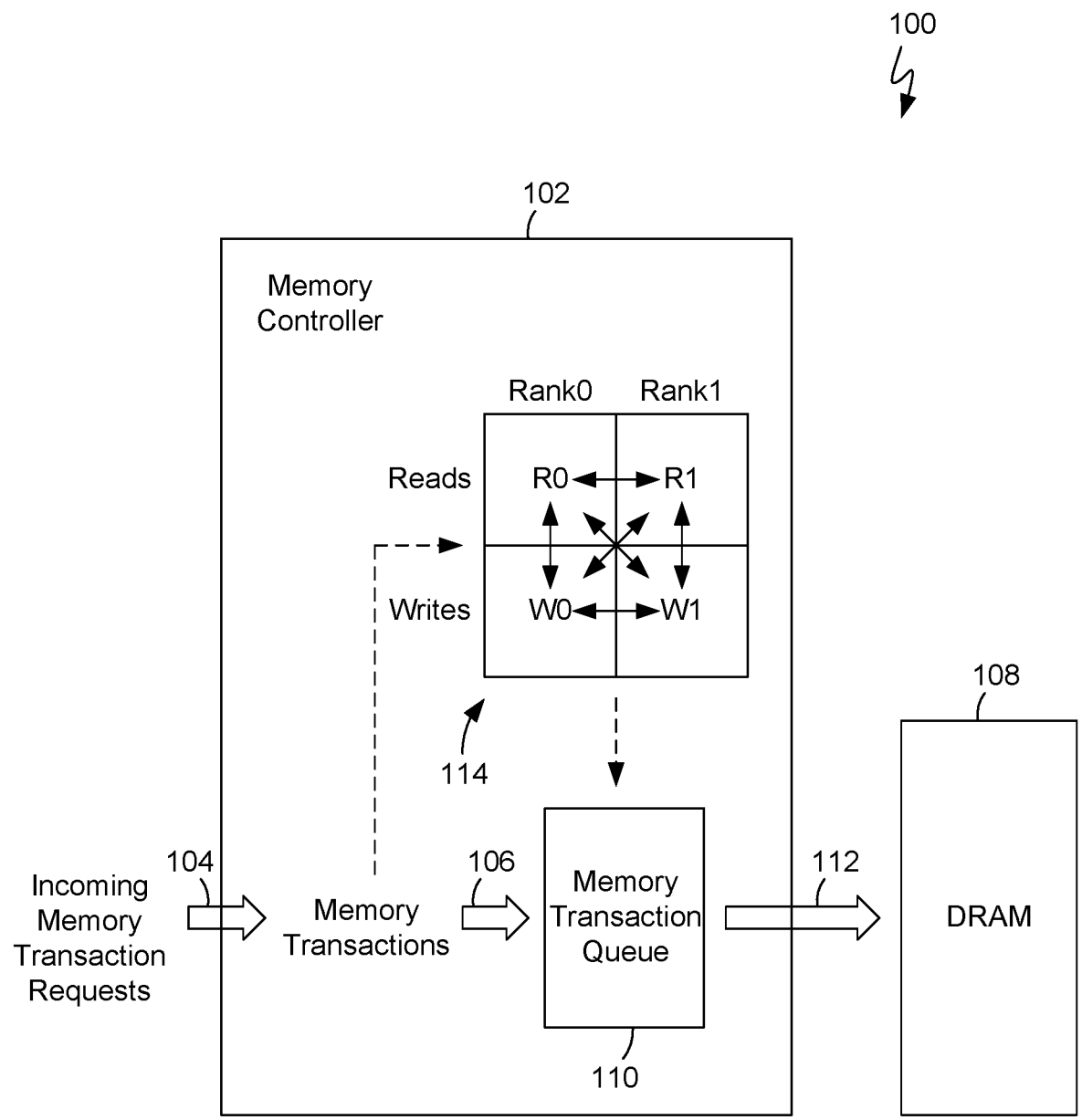
FIG. 1 is a block diagram illustrating a computing device having a memory controller coupled to a DRAM, in accordance with exemplary embodiments.

As illustrated in conceptual form in FIG. 1, in a computing device 100, which may be of any type, a memory controller 102 may, among other functions, translate incoming memory transaction requests 104 from one or more processing engines (not shown) into corresponding memory transactions 106. A memory transaction request 104 may be, for example, a read request, i.e., a request to read data from a DRAM 108, or a write request, i.e., a request to write data to the DRAM 108. A transaction 106 is a set of data elements that may include one or more commands directed to the DRAM 108, data words to be written to the DRAM 108, and target addresses in the DRAM 108.

Another function of the memory controller 102 is to schedule the transactions 106. Transaction scheduling is a method or process by which the memory controller 102 determines and otherwise controls the timing under which the transactions 106 (i.e., sets of commands, data, and addresses) are sent to the DRAM 108. Some aspects of the timing may be relative to other transactions 106, such as, for example, the order or priority in which the transactions 106 are sent to the DRAM 108. Other aspects of the timing may be relative to timing constraints imposed by the capabilities of the DRAM 108. The memory controller 102 may order the transactions 106 using a transaction queue 110 (also referred to as a command queue) and control the time at which the constituent DRAM commands 112 of the transactions 106 are sent from the transaction queue 110 to the DRAM 108.

The transaction scheduling may be based on a technique referred to in this disclosure as "adaptive transaction scheduling." In the exemplary embodiment shown in FIG. 1, the DRAM 108 may consist of two ranks. In such dual-rank DRAM embodiments, the adaptive subset scheduling may be referred to as "adaptive quadrant scheduling," based on a quadrant structure 114. In FIG. 1 the quadrant structure 114 is shown in conceptual form; the quadrant structure 114 may be embodied in control logic (not separately shown in FIG. 1) of the memory controller 102 in any manner. The quadrant structure 114 may, for example, involve one or more data structures or finite state machines. In the example shown in FIG. 1, the quadrant structure 114 is conceptually organized as a grid or table in which the two rows correspond to the direction of the transaction (i.e., read or write), and the two columns correspond to the two ranks of the DRAM 108. In adaptive quadrant scheduling, transactions may be grouped or identified in accordance with the quadrant structure 114 as belonging to or associated with one of four groups or quadrants: "R0," which refers to reads ("R") from a first rank (Rank "0") of the DRAM 108; "R1," which refers to reads from a second rank (Rank "1") of the DRAM 108; "W0," which refers to writes ("W") to the first rank of the DRAM 108; and "W1," which refers to writes to the second rank of the DRAM 108.

More generally, in adaptive subset scheduling, transactions may be grouped or identified by a combination of direction (i.e., read or write) and DRAM rank. Systems, methods and other embodiments of adaptive subset scheduling described herein may be applied to a DRAM having any number (N) of ranks. Although not shown for purposes of clarity, adaptively scheduling memory transactions directed to a DRAM having N ranks may be based on a structure conceptually organized as a grid or table having two row and N columns (or, alternatively, two columns and N rows), defining 2N unique subsets.

In a manner described below with regard to exemplary embodiments, the adaptive subset scheduling dynamically (i.e., at run-time) adapts the above-referenced memory scheduling based on the set of transactions in one or more of the subsets. For example, in accordance with an aspect of the adaptive quadrant scheduling indicated in FIG. 1 by the double-ended arrows between each pair of quadrants in the quadrant structure 114, the order in which the quadrants are selected for sending their transactions 106 to the DRAM 108 may be dynamically adapted. In accordance with another aspect of the adaptive quadrant scheduling, transactions 106 in each subset may be selected for sending to the DRAM 108. In accordance with yet another aspect of the adaptive subset scheduling, the order in which the transactions 106 in a selected subset are sent to the DRAM 108 may be dynamically adapted. Still other aspects of the adaptive subset scheduling are described below.

Figure 2:
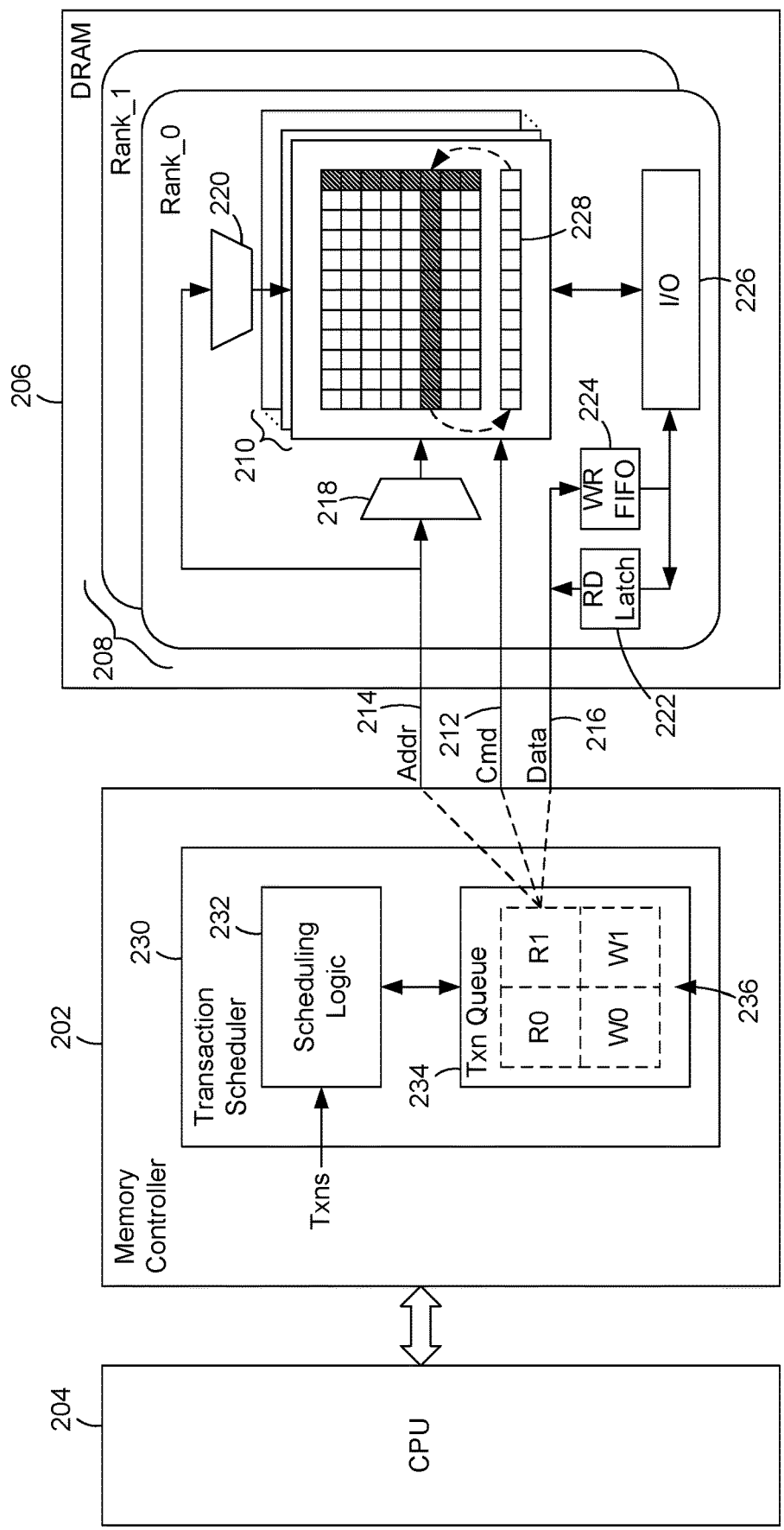
FIG. 2 is a block diagram illustrating a system for scheduling DRAM transactions in a computing device, in accordance with exemplary embodiments.

As illustrated in FIG. 2, in an illustrative or exemplary embodiment a memory controller 202 may receive memory transaction requests from one or more processing engines, such as a central processing unit ("CPU") 204. The memory transaction requests may comprise read requests and write requests directed to a, for example, dual-rank DRAM 206. The DRAM 206 may be, for example, double-data rate synchronous DRAM ("DDR-SDRAM"). The memory controller 202 may translate the memory transaction requests into DRAM transactions (sometimes abbreviated "txns") in a conventional manner. As this conventional function of the memory controller 202 and related functions are well understood by one of ordinary skill in the art, such aspects of the memory controller 202 are not described herein.

The DRAM 206 may have a conventional structure and operate in a conventional manner. Although such structure and operation are well understood by one of ordinary skill in the art, the following brief description is provided as background. The term "dual rank" means that the DRAM 206 may comprise two ranks 208, which may be referred to as Rank_0 and Rank_1. As the two ranks 208 are identical to each other, the following description applies to each rank 208. The rank 208 comprises two or more banks 210. For example, each rank 208 may consist of eight banks 210. Each bank 210 is organized as a two-dimensional array of storage locations or cells indexed by rows and columns, an exemplary row and an exemplary column of which are highlighted in cross-hatch in FIG. 2 for purposes of illustration. Although a dual-rank DRAM 206 is described herein for purposes of clarity, it should be understood that in other embodiments the number (N) of ranks in such a DRAM may be any number greater than or equal to two.

Each transaction may comprise one or more commands 212, target addresses 214, and data 216. The commands 212 may include read commands and write commands, among others. The target addresses 214 may include row addresses, column addresses, and bank addresses. Although not shown for purposes of clarity, in response to a rank address (e.g., a chip select bit included in the read or write command) provided by the memory controller, rank address decoding logic may select one of the ranks 208. Although likewise not shown for purposes of clarity, in response to a bank address provided by the memory controller, bank address decoding logic may select one of the banks 210 in a selected rank 208. In response to a row address provided by the memory controller, a row address decoder 218 may select one of the rows in a selected bank 210 in a selected rank 208. Similarly, in response to a column address provided by the memory controller, a column address decoder 220 may select one of the columns in a selected bank 210 in a selected rank 208. The data 216 may include (outgoing or "read") data that the DRAM 206 sends to the memory controller 202 and (incoming or "write") data that the DRAM 206 received from the memory controller 202. The commands 212, addresses 214, etc., are shown separately and at a conceptual level in FIG. 2 for purposes of clarity. At a physical level, a memory bus (not shown) between the memory controller 202 and DRAM 206 may multiplex or re-utilize some of the same physical signal lines for different types of signals at different times, as understood by one of ordinary skill in the art.

Each rank 208 may have a read latch 222 to buffer the read data, and a write latch 224 to buffer the write data. Each rank 208 may also have input/output ("I/O") logic 226 configured to direct the read and write data from and to selected memory locations.

Each bank 210 may have a row buffer 228. The row buffer 228 stores the contents of the selected row (sometimes referred to as a "page"). A row must be selected or "opened" before it may be written to or read from. The DRAM 206 opens a row, i.e., stores the contents of that row in the row buffer 228, in response to an activate ("ACT") command. The row address may be provided with the ACT command. Once a row is activated or opened, the DRAM 206 may read from or write to any number of columns in the row buffer 228 in response to read or write commands, also referred to as column address select ("CAS") commands. Following a read or write command, the data is transferred serially between the memory controller 202 and DRAM 206 in units known as a "burst," which may be, for example, eight bits per data signal line. The row must be restored or "closed" after writing to or reading from the row buffer 228. The DRAM 206 closes a row, in response to a pre-charge ("PRE") command. In translating a read request or write request, the memory controller 202 determines a sequence and timing of one or more commands needed to fulfill the request. The memory controller 202 also performs periodic refresh operations on all rows in all banks 210 of both ranks 208 to maintain data integrity, and there are commands associated with such refresh operations.

The memory controller 202 may include a transaction scheduler 230 that controls the scheduling methods described herein. The transaction scheduler 230 may include scheduling logic 232 and a transaction queue 234. As described below with regard to exemplary methods, the scheduling logic 232 of the memory controller 202 may be configured to form the memory transactions into quadrant subsets 236 using the above-described quadrant structure 114 (FIG. 1). More generally, with regard to a DRAM having N ranks (where N is an integer greater than or equal to one), the scheduling logic 232 may be configured to form the memory transactions into 2N subsets. Each of the first through the Nth subset may comprise transactions identified as reads directed to corresponding ones of the first through the Nth rank, and each of the (N+1)th through the 2Nth subset may comprise transactions identified as writes directed to corresponding ones of the first through the Nth rank. Although not shown for purposes of clarity, the scheduling logic 232 may comprise a processing system (e.g., a combination of one or more processors and associated memory), a finite state machine, or other logic configurable to perform or otherwise control the methods described herein. In embodiments in which the scheduling logic 232 comprises a processing system, the processing system may be configured by executing firmware instructions.

The memory controller 202 may classify or bin each transaction in relation to the efficiency (e.g., latency or bandwidth) with which the transaction may be completed. The memory controller 202 may identify each transaction as a "hit," a "miss," or a "conflict" on the basis of the current state of DRAM banks. A hit is a read or write transaction to a row (in a bank 210) that the memory controller 202 determines is open at the time the memory controller 202 translates the transaction request. A miss is a read or write transaction to a row (in a bank 210) that the memory controller 202 determines is closed or pre-charged at the time the memory controller 202 translates the transaction request. If the memory controller 202 identifies a read or write transaction as a miss, the memory controller 202 must first open the row before reading from or writing to the row. A conflict is a read or write transaction to a row (in a bank 210) that the memory controller 202 determines is closed at the time the memory controller 202 translates the transaction request, while the memory controller 202 determines that another row to the same rank and bank (to which the memory transaction is not directed) is open at that time. If the memory controller 202 identifies a read or write transaction as a conflict, the memory controller 202 must first pre-charge (i.e., close) the open row in that bank, then open the row to which the transaction is directed before reading from or writing to that row. For conciseness in the following descriptions, a transaction identified as a hit may be referred to in an abbreviated manner as "a hit," a transaction identified as a miss may be referred to in an abbreviated manner as "a miss," and a transaction identified as a conflict may be referred to in an abbreviated manner as "a conflict."

Completing a transaction incurs various latencies or time costs, which may vary depending upon whether a transaction is a hit, miss, or conflict, whether a transaction involves transferring data in a reverse direction from the preceding transaction, whether a transaction involves transferring data in a different rank from the preceding transaction, and other factors. These latencies are generally specified by the manufacturer of the DRAM 206. Examples of commonly specified latencies include: tRCD (i.e., row-to-column delay), which is the minimum number of clock cycles that must elapse between sending an ACT command to the DRAM 206 to open a row and sending a CAS command to the DRAM 206 to select a column on the open row; tRP (i.e., read-after-precharge), which is the minimum number of clock cycles that must elapse between sending a PRE command to the DRAM 206 to close a row and sending an ACT command to the DRAM 206 to open another row on the same bank; tRRD (i.e., read-to-read delay), which is the minimum number of clock cycles that must elapse between the activation of two rows in different banks in the same rank; tRD2PRE, which is a representative timing constraint representing the minimum number of clock cycles that must elapse between sending a read (CAS) command and sending a PRE command; and tWR2PRE, which is a representative timing constraint representing the minimum number of clock cycles that must elapse between sending a write (CAS) command and sending a PRE command.

As illustrated in flow diagram form in FIG. 3, a method 300 for scheduling DRAM transactions in a computing device may include steps or actions described below with regard to blocks 302-308. The method 300 may be performed or otherwise controlled by, for example, the above-described memory controller 202 (FIG. 2). The memory controller 202 or portions thereof (e.g., scheduling logic 232, transaction queue 234, etc.) may be examples of means for performing functions described below with regard to the method 300.

As indicated by block 302, the method 300 may include determining a plurality of DRAM transactions corresponding to a plurality of transaction requests received from one or more processors. Determining DRAM transactions corresponding to transaction requests may be performed in a conventional manner, as understood by one of ordinary skill in the art. Additionally, each transaction may be identified by a combination of direction (i.e., read or a write) and to which of the N ranks of the DRAM the transaction is directed. For example, in a dual-rank DRAM embodiment such as described above with regard to FIG. 2, each transaction may be identified as a read from a first rank ("R0"), a read from a second rank ("R1"), a write to the first rank ("W0"), or a write to the second rank ("W1"). Conceptually, each transaction may be described as being "in" or "associated with" one of the four quadrants, depending on the direction (i.e., read or write) and rank of the transaction.

Determining the plurality of DRAM transactions may further include identifying each transaction as a hit, a miss, a conflict, or a hit-under-miss/conflict. "Hit-under-miss/conflict" means either a transaction that is initially a miss but will become a hit as soon as another miss directed to the same row in the same bank has activated that row, or a transaction that is initially a conflict but will become a hit as soon as another conflict directed to the same row in the same bank has activated that row. The transactions directed to the DRAM may include any number (i.e., zero or more) of hits, any number of misses, any number of conflicts, and any number of hits-under-misses/conflicts.

As indicated by block 304, the method 300 may include forming the DRAM transactions into a plurality of subsets. Each of the subsets may comprise DRAM transactions that are identified by the same combination of direction (i.e., read or write) and the DRAM rank to which they are directed. In embodiments in which the DRAM has N ranks, each of the first through the Nth subset may comprise transactions identified as reads directed to corresponding ones of the first through the Nth rank, and each of the (N+1)th through the 2Nth subset may comprise transactions identified as writes directed to corresponding ones of the first through the Nth rank. For example, in dual-rank DRAM embodiments (i.e., N=2), the four subsets may comprise a first quadrant subset that includes some or all transactions identified as reads from the first rank (i.e., a subset of the transactions in R0), a second quadrant subset that includes some or all transactions identified as reads from a second rank (i.e., a subset of the transactions in R1), a third quadrant subset that includes some or all transactions identified as writes to the first rank (i.e., a subset of the transactions in W0), and a fourth quadrant subset that includes some or all transactions identified as writes to the second rank (i.e., a subset of the transactions in W1).

Referring briefly again to FIG. 2, the subsets may be formed (conceptually), for example, in the transaction queue 234 by the scheduling logic 232. Nevertheless, it should be understood that the transactions may be formed into subsets, stored (in the queue 234 or elsewhere), or otherwise processed in a manner enabling them to be identified as a subset in any manner. Exemplary methods for forming the subsets are described below.

As indicated by block 306, the method 300 may include selecting one of the subsets. Exemplary methods for selecting one of the subsets are described below.

As indication by block 308, the method 300 may include sending the transactions in the selected subset to a DRAM, such as, for example, the above-described dual-rank DRAM 206 (FIG. 2). As described below, sending the transactions to the DRAM may include scheduling or selecting an order in which the transactions in the selected subset are then sent to the DRAM. Exemplary methods for sending the transactions in the selected subset to a DRAM are described below.

It should be understood that the method 300 may be performed repeatedly. For example, determining the memory transactions as described above with regard to block 302, forming the transactions into subsets as described above with regard to block 304, and sending the transactions to the DRAM as described above with regard to block 306 may be performed essentially continuously as transaction requests are received and corresponding transactions are determined. For example, with regard to the exemplary embodiment described above with regard to FIG. 2, the scheduling logic 232 may be in an idle state when no transactions are being determined and thus the scheduling logic 232 is not selecting, sending, etc., transaction subsets. As soon as at least one transaction has been determined and thus is present for the scheduling logic 232 to act upon, the scheduling logic 232 may change from the idle state to an initial state.

As described below in further detail, certain operations relating to sending the selected subset to the DRAM may be occurring contemporaneously or substantially in parallel with other operations relating to another subset. For example, ACT, PRE and CAS commands may be sent in relation to sending a subset that may be referred to as a "leader" subset, while only ACT and PRE commands are being sent in relation to sending a subset that may be referred to as a "follower" subset. When at least one transaction has been determined and thus is present for the scheduling logic 232 to act upon, the scheduling logic 232 may change from the idle state to the initial state and may designate the subset (e.g., quadrant) with which the transaction is associated as the leader. As soon as at least one other transaction associated with a different subset (e.g., quadrant) is present for the scheduling logic 232 to act upon, the scheduling logic may designate that other subset (e.g., quadrant) as the follower. Further aspects relating to leader and follower subsets are described below.

As illustrated in flow diagram form in FIG. 4, an exemplary method 400 for forming a subset may include steps or actions described below with regard to blocks 402-414. The method 400 may be an example of above-described block 304 of the method 300 (FIG. 3). The method 400 may be applied to the transactions identified as described above with regard to block 302. That is, the method 400 may be applied to the transactions as grouped or identified by combinations of direction (i.e., read or write) and rank. For example, in dual-rank DRAM embodiments the method 400 may be performed for each quadrant, and the subset comprises selected transactions in the quadrant. Broadly, the method 400 relates to selecting efficient subsets of the transactions. Efficiency may be related to, for example, bank spread, transaction count, transaction burst length, or other factors.

As indicated by block 402, all hits may be selected, regardless of in which bank the hit may be. Although not shown for purposes of clarity, the selected hits (H) may be organized in a list. As indicated by block 404, one miss per bank in banks without hits (i.e., banks not having any hits and thus not having transactions selected in block 402) may be selected. Although not shown for purposes of clarity, the selected misses (M) may be organized in a list.

As indicated by block 406, in addition to transactions selected in blocks 402 and 404, one conflict per bank in banks without hits or misses (i.e., banks not having any hits or misses and thus not having transactions selected in block 402) may be selected. As indicated by block 408, all hits-under-misses/conflicts that are under transactions selected in blocks 404 and 406 may be selected. Although not shown for purposes of clarity, the selected conflicts (C) as well as selected hits under misses (Mx) and selected hits under conflicts (Cx) (collectively, selected hits under misses/conflicts (X=Mx+Cx)) may be organized in respective lists.

As indicated by block 409, the lists of selected misses (M), hits under misses (Mx), conflicts (C), and hits under conflicts (Cx) may be sorted in decreasing order of their datacycle count. The datacycle count for a transaction is the number of clock cycles that would be used on the DRAM data bus to transfer the data. For example, for a 16-bit data bus to transfer 64 bytes (512 bits) of data, it would take 16 DRAM clock cycles or data cycles.

As indicated by block 410, transactions directed to banks that are also due for refresh operations may be discarded under some circumstances. For example, in a dual-rank embodiment, if the memory controller needs to schedule a per-bank refresh ("PBR") for a bank at the time the memory controller performs the method 400 on the quadrant that has transactions to the same bank as the PBR above, the memory controller may ignore (i.e., not select) all transactions to that bank that the method 400 may otherwise have indicated to select. Similarly, for example, if the memory controller needs to schedule an all-bank refresh ("ABR") for a quadrant at the time the memory controller performs the method 400 on that quadrant, the memory controller may not select all transactions to both the quadrants in the same rank as the ABR above, that the method 400 may otherwise have indicated to select. In other words, if the memory controller needs to schedule an ABR for a quadrant, the memory controller may not perform the method 400 on both the quadrants in the same rank as the ABR, leaving both quadrant subsets empty or null.

As indicated by block 411, any inefficient transactions that were selected in blocks 402-408 may be discarded from the subset. For example, one or more selected misses, conflicts, or hits-under-misses/conflicts in a bank may be discarded if scheduling them would result in inefficiency. An exemplary method for discarding inefficient transactions is described in further detail below.

As indicated by blocks 412 and 414, as the remaining selected transactions forming the subset begin to be sent (block 412) to the DRAM, further or additional transactions may be selected (block 414), i.e., added to the subset. As described in further detail below, such further transactions may be selected as time constraints may permit (without negatively impacting efficiency). Selecting further or additional transactions to add to the subset may be referred to as "lazy evaluation" (i.e., evaluation delayed so long as time permits). Note that in some instances the memory controller may add transactions after it has begun performing the method 400 (e.g., in response to additional incoming transaction requests). In such instances, a newly added transaction may be evaluated in a manner described below to determine whether to select it for inclusion in the subset.

Figure 4:
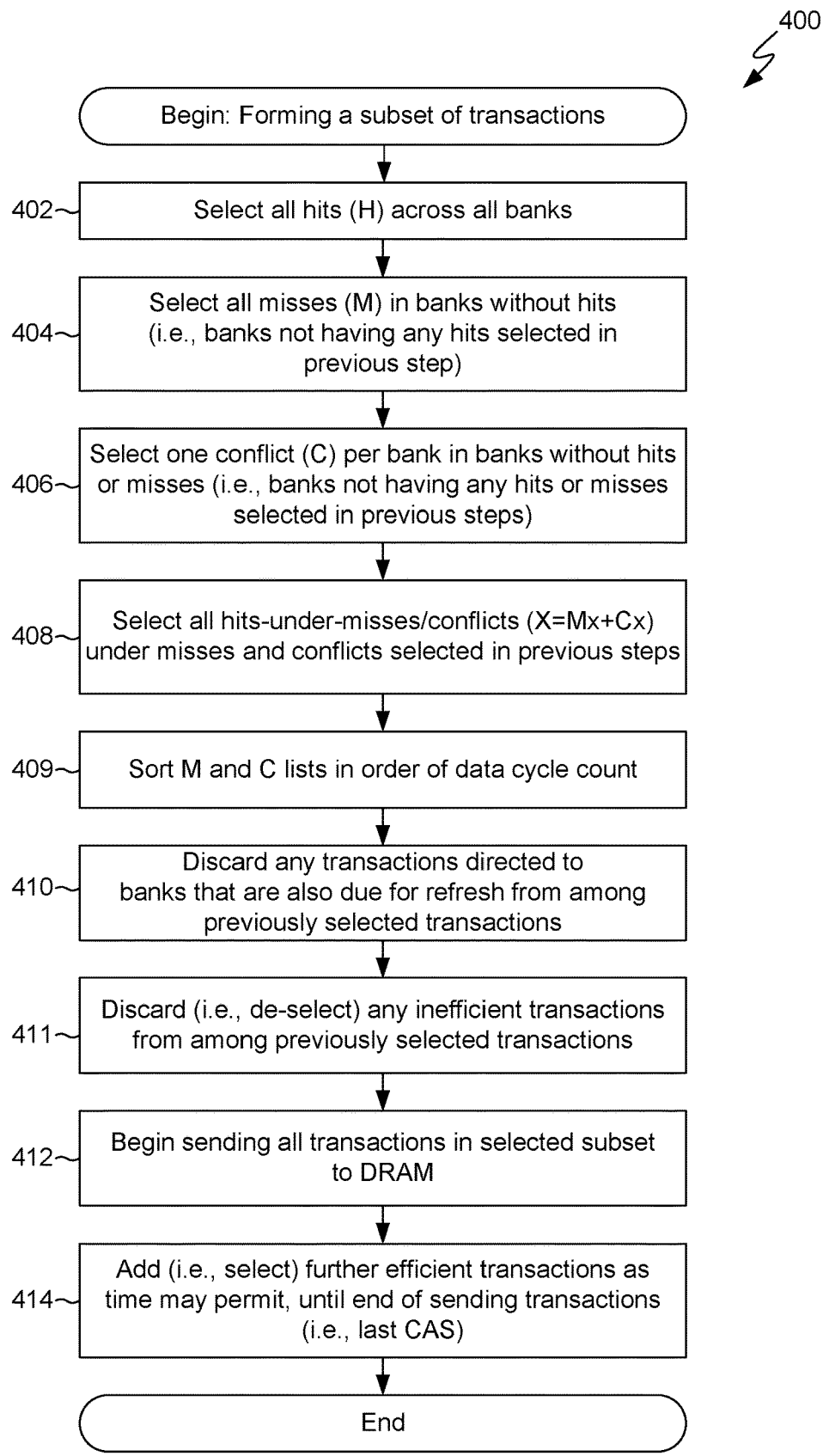
FIG. 4 is a flow diagram illustrating a method for forming a subset of transactions, in accordance with exemplary embodiments.
Figure 5A:
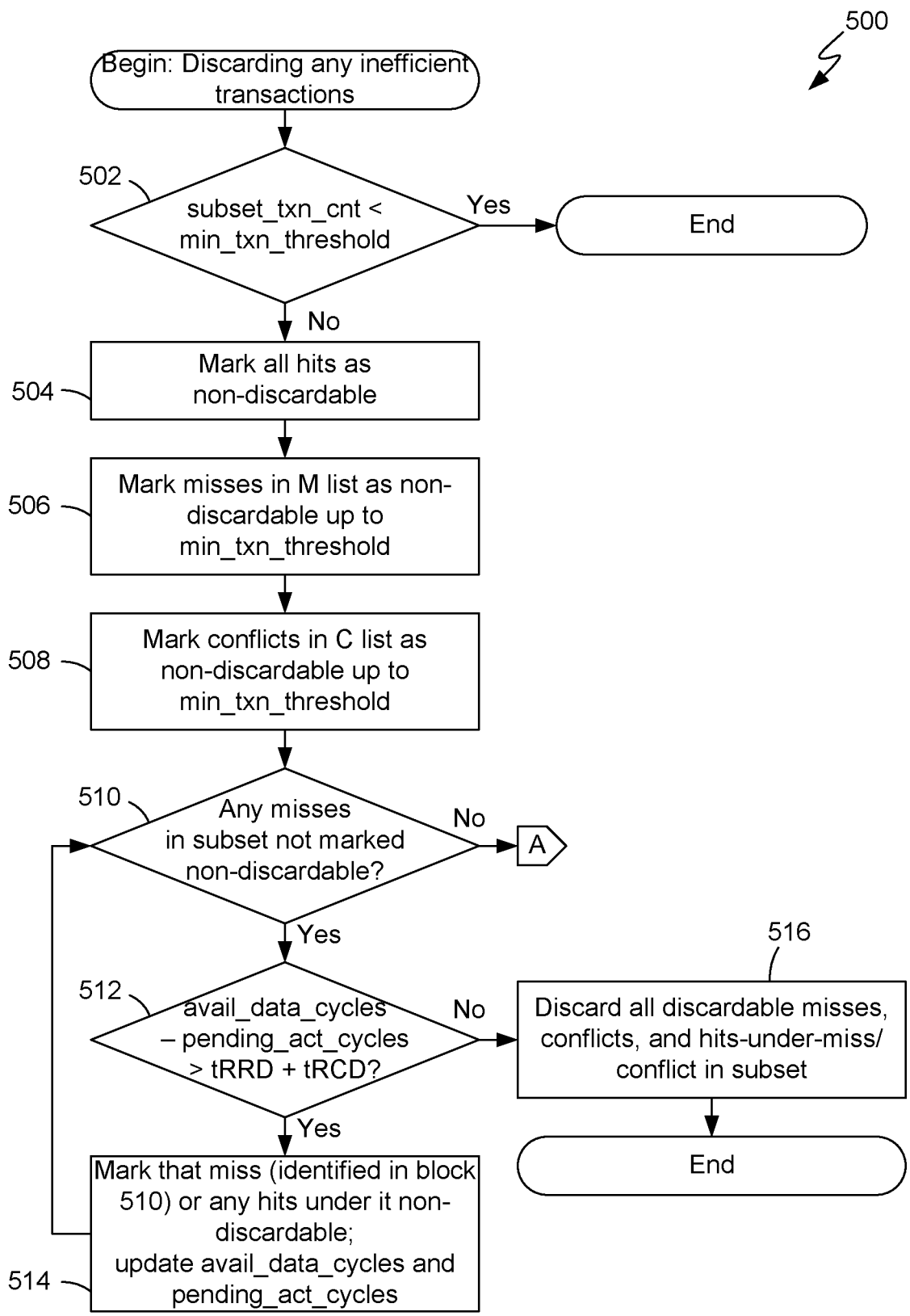
FIG. 5A is a portion of a flow diagram illustrating method for discarding inefficient transactions from a subset of transactions, in accordance with exemplary embodiments.

As illustrated in flow diagram form in FIGS. 5A-5B, an exemplary method 500 for de-selecting or discarding inefficient transactions from a subset may include steps or actions described below with regard to blocks 502-526. The method 500 may be an example of above-described block 411 of the method 400 (FIG. 4). Transactions that were selected in blocks 402-408 may be discarded from the subset if they would be inefficient to complete. Broadly described, the method 500 may discard from the subset any misses, conflicts, and hits-under-misses/conflicts for which an insufficient number of data cycles remain to complete.

As indicated by block 502, it may be determined whether the total number or count of transactions ("subset_txn_cnt") in the subset is less than a minimum transaction threshold ("min txn_threshold"). Min txn_threshold is a fixed or predetermined number for which a suitable value (e.g., 4 or 8) will readily occur to one of ordinary skill in the art in view of the following descriptions and examples. The total number or count of transactions may be the sum of the number of transactions in the H, M, C and X lists described above with regard to blocks 402-408 (FIG. 4). Note that there may be zero or more transactions in each of the H, M, C and X lists. If it is determined in block 502 that the total number of transactions in the subset is less than the minimum transaction threshold, then the method 500 may end without any transactions being discarded from the subset.

If it is determined in block 502 that the total number of transactions in the subset is not less than the minimum transaction threshold, then all hits (e.g., in the H list described above with regard to FIG. 4) may be marked as non-discardable, as indicated by block 504. That is, the remainder of the method 500 omits those transactions from further consideration whether to discard them from the subset. The number of hits marked as non-discardable is added to a count (initially zero) of non-discardable transactions.

As indicated by block 506, after hits (if any) have been marked as non-discardable, then one or more misses (e.g., in the above-referenced M list) may be marked as non-discardable. Although not explicitly shown as sub-steps of block 506 for purposes of clarity, so long as there are one or more transactions in the M list, and so long as the count of the non-discardable transactions in the subset has not reached the minimum transaction threshold, the method 500 may proceed through the M list transaction by transaction, marking the next miss as non-discardable, and accordingly incrementing the count of non-discardable transactions in the subset.

As indicated by block 508, after hits (if any) and misses (if any) have been marked as non-discardable, then one or more conflicts (e.g., in the above-referenced C list) may be marked as non-discardable. Although not explicitly shown as sub-steps of block 508 for purposes of clarity, so long as there are one or more transactions in the C list, and so long as the count of the non-discardable transactions in the subset has not reached the minimum transaction threshold, the method 500 may proceed through the C list transaction by transaction, marking each conflict as non-discardable, and accordingly incrementing the count of non-discardable transactions in the subset.

As indicated by block 510, after hits (if any), misses (if any), and conflicts (if any) have been marked as non-discardable, it may be determined whether any misses remain in the subset (e.g., in the above-referenced M list) that have not been marked non-discardable and therefore remain potentially discardable. If it is determined in block 510 that one or more misses remain potentially discardable, then it may be determined whether the difference between number of available data cycles ("avail_data_cycles") and the number of pending ACT cycles ("pending_act_cycles") is greater than the sum of tRRD and tRCD, as indicated by block 512.

Figure 3:
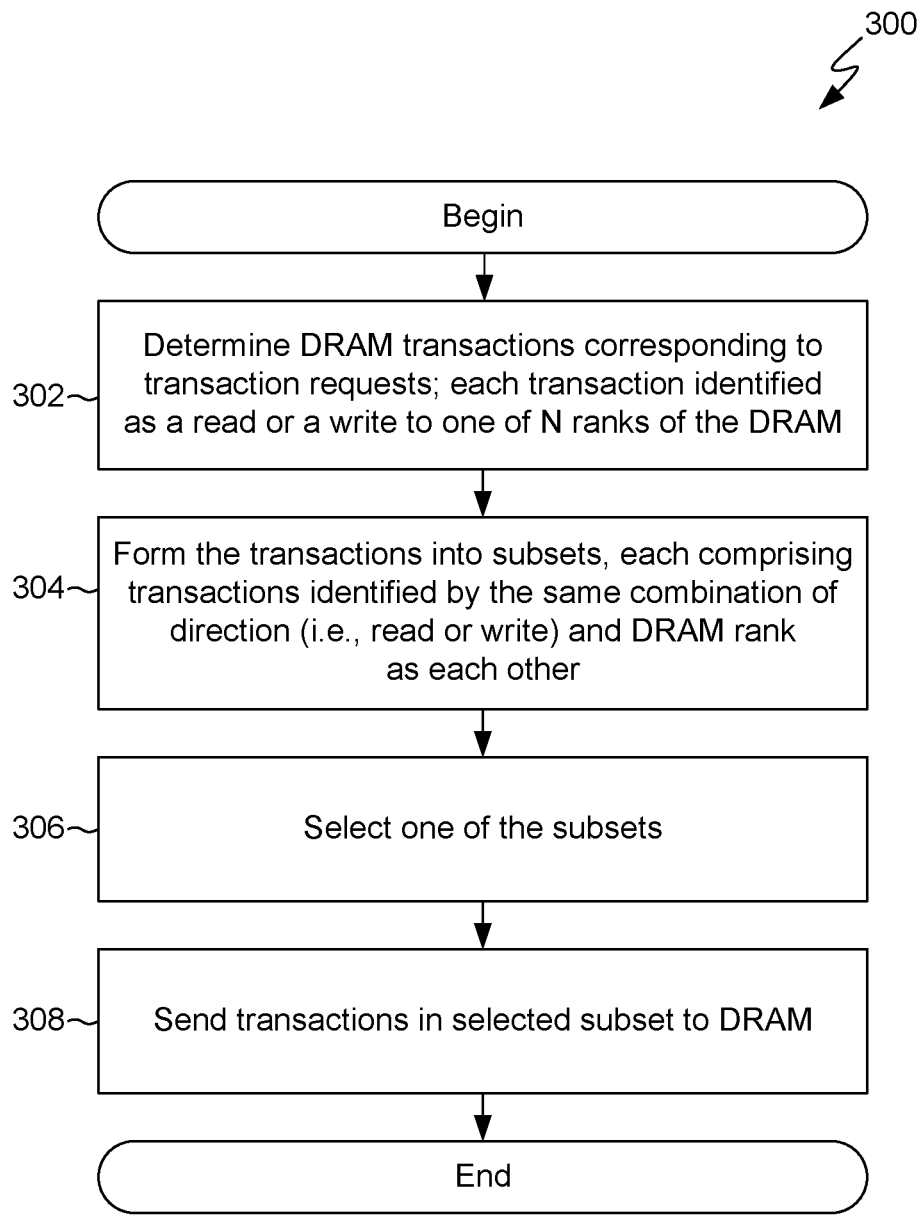
FIG. 3 is a flow diagram illustrating a method for scheduling DRAM transactions in a computing device, in accordance with exemplary embodiments.

The initial number of available data cycles (when block 512 is performed) is the sum of the number of pending data cycles and the number of idle data cycles. This may be expressed as, initially:

$$avail\_data\_cycles = pending\_data\_cycles + idle\_data\_cycles,$$

where pending_data_cycles is the number of data cycles required to complete all the non-discardable transactions in the subset currently being formed (under step 304 of FIG. 3). This may be expressed as:

$$pending\_data\_cycles = data\_cycles(non\text{-}discarded\ transaction).$$

Idle_data_cycles is the greater (i.e., a "max" function) of the time required to schedule a page conflict (worst case tRCD+tRP) and the time required to schedule the previous subset pending transactions, the switch cost to the current subset and the allowable inefficiency data cycles. This may be expressed as:

$$idle\_data\_cycles = max(prev\_subset\_pending\_data\_cycles + switch\_cost + allowable\_inefficiency\_data\_cycles, tRCD + tRP),$$

where prev_subset_pending_data_cycles is the number of data cycles needed to complete all the pending transactions in the previously selected subset. Switch_cost is the number of data cycles that elapse when switching from sending the last CAS transaction in one subset (e.g., in one quadrant) to sending the first CAS transaction in another subset (e.g., in another quadrant). (Sending transactions from the memory controller to the DRAM is described in further detail below.) In other words, switch_cost is the time penalty to switch between directions (i.e., from read to write, or from write to read), to switch ranks, or both. Note that both prev_subset_pending_data_cycles and switch_cost would have values of zero when there is no switching between a leader and follower subset (because the scheduling logic is idle). Allowable_inefficiency_data_cycles is a fixed or predetermined threshold number of data bus cycles that identifies an allowable measure of inefficiency to opportunistically retain more transactions in the current subset, and may readily be selected by one of ordinary skill in the art. The initial number of pending_act_cycles (when block 512 is performed) is the time it would take to schedule all the pending ACTs in the current leader and the non-discardable transactions in the subset under consideration. This can be expressed as:

$$pending\_act\ cycles = pending\_act\_cycles\_in(leader + non\text{-}discardable\ txns\ above)*tRRD.$$

As indicated by block 514, if it is determined in block 512 that the difference between the number of available data cycles and the number of pending ACT cycles is greater than the sum of tRRD and tRCD, then the miss (identified in block 510) and any hits under it (i.e., a hit-under-miss) in the M and Mx lists are not discarded but rather are allowed to remain in the subset (e.g., in their respective M and Mx lists). Also, in block 514, the number of available data cycles may be updated by incrementing the number of available data cycles by the number of data cycles used to complete that miss transaction and any hits under it. Likewise, in block 514 the number of pending ACT cycles may be updated by incrementing it by tRRD. These updates may be expressed as:

$$avail\_data\_cycles += data\_cycles(miss\ and\ any\ hits\ under\ it),\ and$$

$$pending\_act\ cycles += tRRD.$$

Following block 514, the method 500 may return to block 510 to determine whether the subset includes another miss that has not been marked non-discardable.

If it is determined in above-described block 512 that the difference between the number of available data cycles and the number of pending ACT cycles is less than the sum of tRRD and tRCD, then all misses, conflicts, and hits-under-misses/conflicts remaining in the subset (e.g., in the M, C and X lists, respectively), i.e., that are still discardable, may be discarded from the subset, as indicated by block 516. Following block 516 the method 500 may end, and no further transactions are discarded from the subset.

Figure 5B:
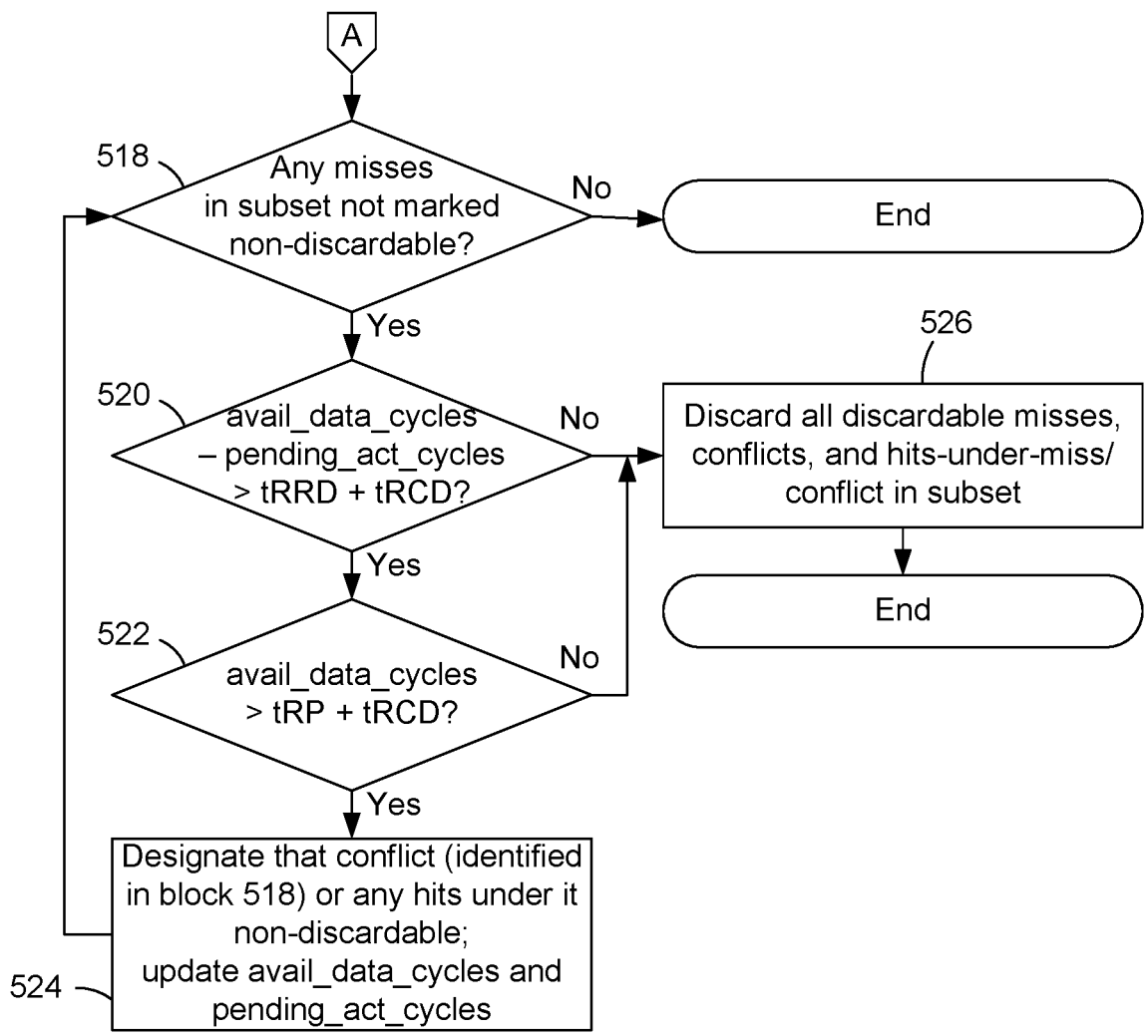
FIG. 5B is another portion of the flow diagram illustrating method for discarding inefficient transactions from a subset of transactions, continued from FIG. 5A, in accordance with exemplary embodiments.

If it is determined in block 510 that there are no potentially discardable misses remaining in the subset (e.g., in the above-referenced M list), then the method 500 may continue at block 518 (FIG. 5B). As indicated by block 518, it may be determined whether any conflicts remain in the subset (e.g., in the above-referenced C list) that have not been marked discardable and therefore remain potentially discardable.

If it is determined in block 518 that there are no conflicts that remain potentially discardable, then the method 500 may end, and no further transactions are discarded from the subset. If it is determined in block 518 that one or more conflicts remain potentially discardable, then it may be determined whether the difference between the number of available data cycles and the number of pending ACT cycles is greater than the sum of tRRD and tRCD, and whether the number of available data cycles is greater than the sum of tRP and tRCD, as indicated by blocks 520 and 522, respectively.

As indicated by block 524, if it is determined in blocks 520 and 522 that the difference between the number of available data cycles and the number of pending ACT cycles is greater than the sum of tRRD and tRCD, and the number of available data cycles is greater than the sum of tRP and tRCD, then the conflict (identified in block 518) and any hits under it (i.e., a hit-under-conflict) in the C and Cx lists are not discarded but rather are allowed to remain in the subset (e.g., in their respective C and Cx lists). Also, in block 524, the number of available data cycles may be updated by incrementing the number of available data cycles by the number of data cycles used to complete that conflict transaction and any hits under it. Likewise, in block 524 the number of pending ACT cycles may be updated by incrementing it by tRRD. Following block 524, the method 500 may return to block 518 to determine whether the subset includes another conflict that has not been marked nondiscardable.

If it is determined in above-described block 520 that the difference between the number of available data cycles and the number of pending ACT cycles is not greater than the sum of tRRD and tRCD, or if it is determined in above-described block 522 that the number of available data cycles is not greater than the sum of tRP and tRCD, then all conflicts, and hits-under-conflicts remaining in the subset (e.g., in the C, C and Cx lists, respectively), i.e., that are still discardable, may be discarded from the subset, as indicated by block 526. Following block 526 the method 600 may end, and no further transactions are discarded from the subset.

Figure 6:
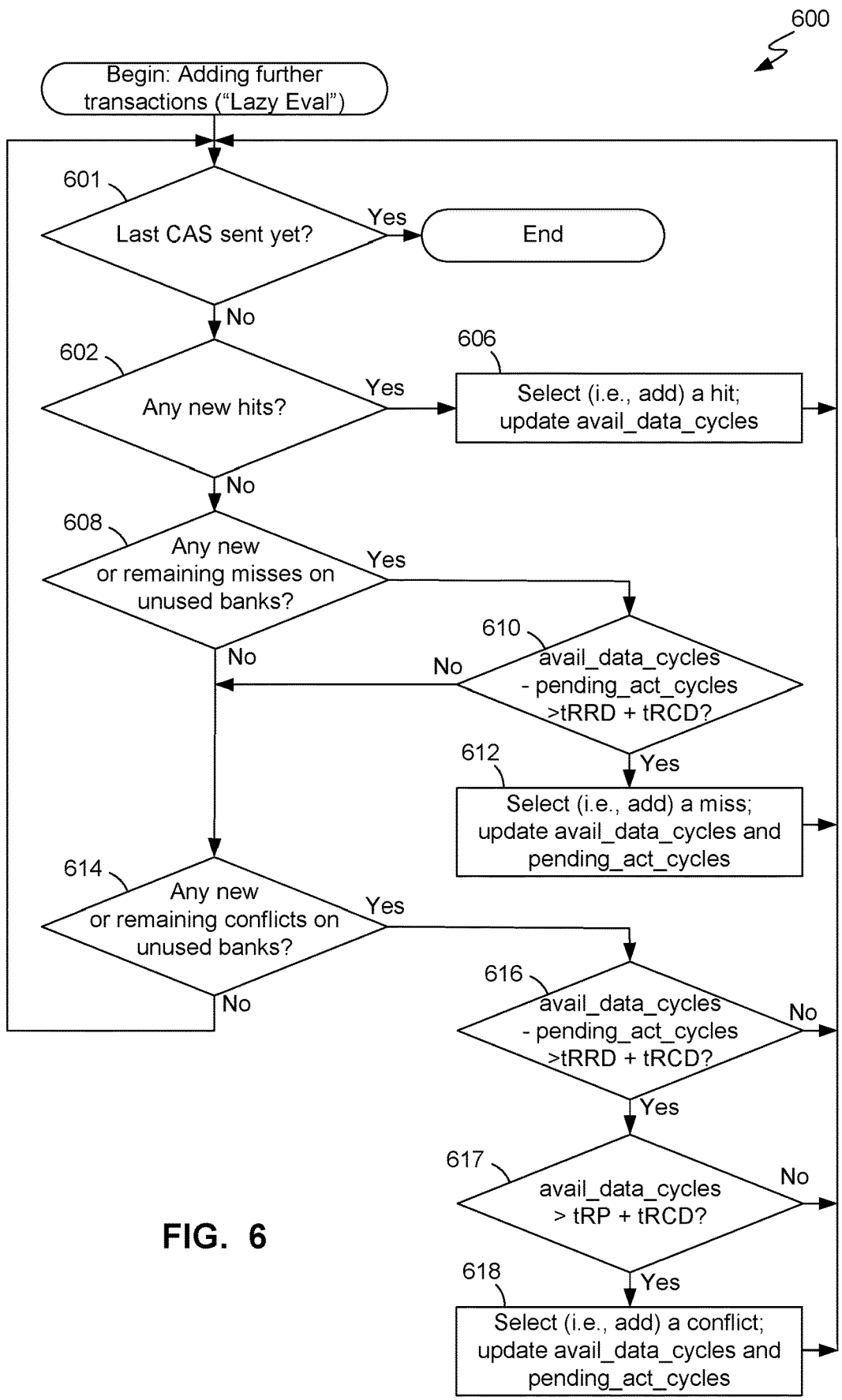
FIG. 6 is a flow diagram illustrating a method for adding further transactions after the subset has begun to be sent to the DRAM, in accordance with exemplary embodiments.

As illustrated in flow diagram form in FIG. 6, an exemplary method 600 for adding further transactions to the leader subset after the memory controller has begun sending the leader subset to the DRAM may include steps or actions described below with regard to blocks 601-618. The method 600 may be an example of above-described block 414 of the method 400 (FIG. 4). Broadly described, transactions that may increase the efficiency of the subset may be added. The transactions to which the method 600 relates may include those that were not present in the memory controller at the time the memory controller began sending the leader subset to the DRAM in accordance with block 412, i.e., when the first CAS command is issued. Such transactions may be referred to as "new" transactions. The transactions to which the method 600 relates may include those that were not selected or discarded in accordance with blocks 402-411 (FIG. 4). Such transactions may be referred to as "remaining" transactions. The method 600 may be performed on every data cycle that a DRAM command associated with the leader subset can be sent to the DRAM, beginning as soon as the first CAS command associated with the leader subset is sent to the DRAM. After the first CAS command associated with the leader subset is sent to the DRAM, the method 600 may repeat (beginning again at block 601) on every data cycle that a DRAM command associated with the leader subset can be sent to the DRAM, until the last CAS command associated with the leader subset is sent to the DRAM, as a new hit may be added at any time before the last CAS is sent.

As indicated by block 602, it may be determined whether there are any new hits. If it is determined in block 602 that there are one or more new hits, then as indicated by block 606 a new hit may be selected, i.e., added to the subset as it adds to the efficiency of the subset, and the available_data_cycles updated to include the data cycles of the newly added hits. Following block 606, the method 600 may return to block 601 and, on the next data cycle in which a DRAM command can be sent, again determine whether the last CAS has been sent. If it is determined in block 601 that the last CAS associated with the current leader subset has been sent, then the method 600 may end and not be performed again until the first CAS associated with the next leader subset is sent.

If it is determined in block 602 that there are no new hits, then it may then be determined whether there are any new or remaining misses on any "unused" banks, as indicated by block 608. An "unused" bank refers to a bank to which no transaction in the current leader subset is directed. If it is determined in block 608 that there are one or more new or remaining misses on one or more unused banks, then it is determined in block 610 whether the difference between the number of available data cycles and the number of pending ACT cycles is greater than the sum of tRRD and tRCD, as indicated by block 610. In the method 600, the number of "pending data cycles" is the number of "available data cycles" that remain after the above-described method 500 (FIGS. 5A-5B) is performed. As indicated by block 612, if it is determined in block 610 that the difference between the number of available data cycles and the number of pending ACT cycles is greater than the sum of tRRD and tRCD, then a new or remaining miss may be selected, i.e., added to the leader subset. Also, in block 612, the number of available data cycles may be updated by incrementing the number of available data cycles by the number of data cycles used to complete that miss transaction. Likewise, in block 618 the number of pending ACT cycles may be updated by incrementing it by tRRD. These updates may be expressed as:

avail_data_cycles+=data cycles(conflict), and pending_act cycles+=tRRD.

Following block 612, the method 600 may return to block 601 and, on the next clock cycle in which a DRAM command can be sent, again determine whether the last CAS has been sent.

If it is determined in block 608 that there are no new or remaining misses on any unused banks, or if it is determined in block 610 that the difference between the number of available data cycles and the number of pending ACT cycles is not greater than the sum of tRRD and tRCD, then it may be determined whether there are any new or remaining conflicts on any unused banks, as indicated by block 614.

If it is determined in block 614 that there are one or more new or remaining conflicts on one or more unused banks, then it may be determined whether the difference between the number of available data cycles and the number of pending ACT cycles is greater than the sum of tRRD and tRCD, and whether the number of available data cycles is greater than the sum of tRP and tRCD, as indicated by blocks 616 and 617, respectively. As indicated by block 618, if it is determined in blocks 616 and 617 that the difference between the number of available data cycles and the number of pending ACT cycles is greater than the sum of tRRD and tRCD, and the number of available data cycles is greater than the sum of tRP and tRCD, then the conflict (identified in block 614) may be selected, i.e., added to the leader subset. Also, in block 618, the number of available data cycles may be updated by incrementing the number of available data cycles by the number of data cycles used to complete that conflict transaction. Likewise, in block 618 the number of pending ACT cycles may be updated by incrementing it by tRRD. These updates may be expressed as:

avail_data_cycles+=data cycles(conflict), and pending_act cycles+=tRRD.

The method 600 may return to block 601 on the next clock cycle in which a DRAM command can be sent, again determine whether the last CAS has been sent, and if not, whether another transaction can be added efficiently.

If it is determined in above-described block 616 that the difference between the number of available data cycles and the number of pending ACT cycles is not greater than the sum of tRRD and tRCD, or if it is determined in above-described block 617 that the number of available data cycles is not greater than the sum of tRP and tRCD, then the method 600 may return to block 601 and, on the next clock cycle in which a DRAM command can be sent, again determine whether the last CAS has been sent.

Figure 7:
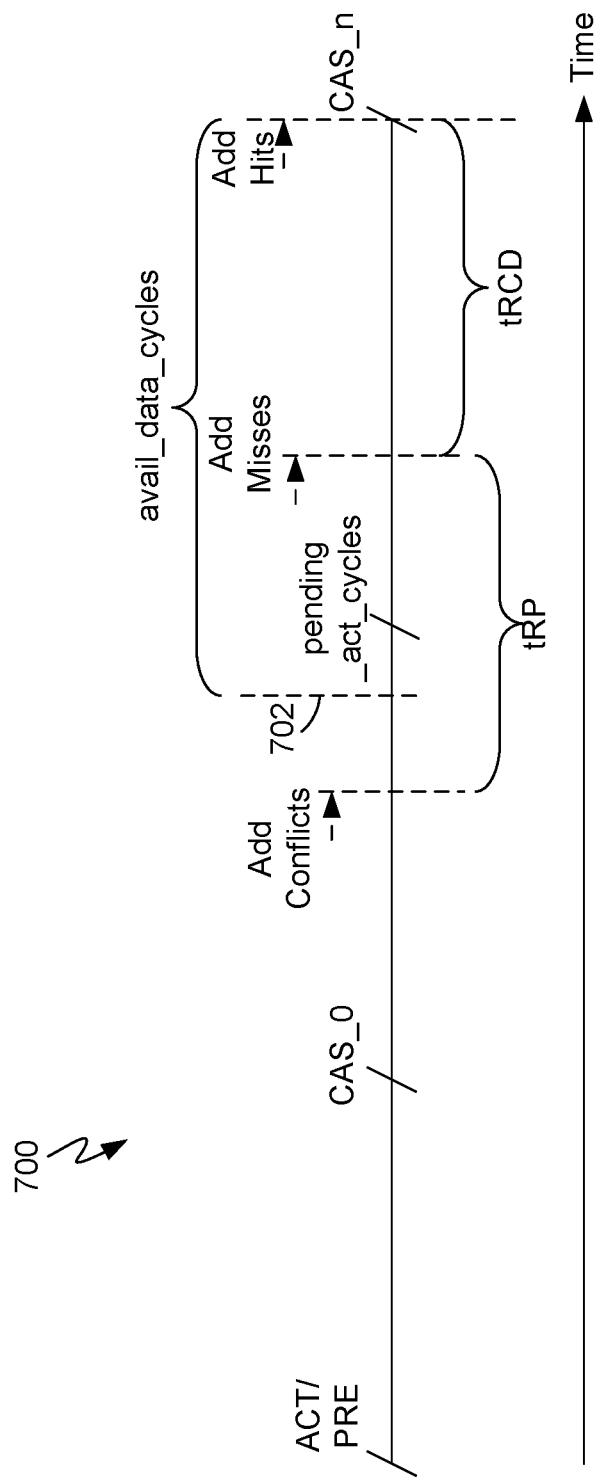
FIG. 7 is a timeline illustrating timing aspects of the method of FIG. 6, in accordance with exemplary embodiments.

As illustrated by the timeline 700 in FIG. 7, in accordance with the above-described method 600 (FIG. 6), new or remaining hits, misses, or conflicts may be added to a leader subset after the memory controller has issued the ACT or PRE command associated with the subset. New or remaining hits, misses, or conflicts may be added after the first CAS ("CAS_0") associated with the subset is sent to the DRAM and before the last CAS ("CAS_n") associated with the subset is sent to the DRAM. A hit may be added at any time before the last CAS is sent. A miss may be added so long as at least tRCD cycles remain before the last CAS. A conflict may be added so long as at least tRCD+tRP cycles remain before the last CAS. In the example shown in FIG. 7, at a time 702 the memory controller is evaluating a new or remaining transaction in accordance with the method 600 (FIG. 6). As the time 702 is less than tRCD+tRP cycles before the last CAS, the memory controller may determine that the new or remaining transaction can be added if it is hit or miss but cannot be added if it is a conflict.

Figure 8:
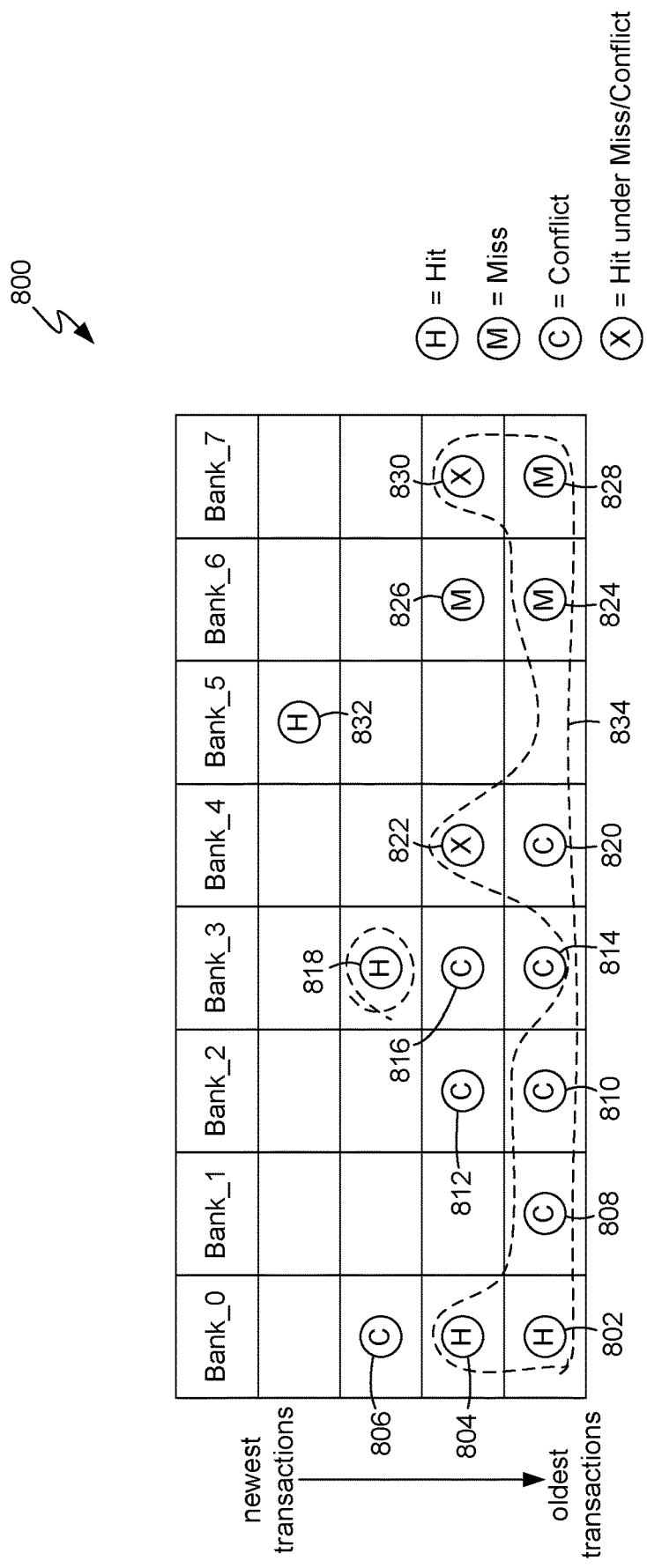
FIG. 8 is a conceptual diagram illustrating an example of forming a subset of transactions by selecting transactions from among a number of banks, in accordance with exemplary embodiments.

In FIG. 8, a conceptual diagram 800 illustrates an example of applying the above-described methods 400 (FIG. 4), 500 (FIG. 5), and 600 (FIG. 6) to a set of transactions. Transactions that have been identified as hits ("H"), misses ("M"), conflicts ("C"), and hits-under-conflicts/misses ("X") are shown in relation to the banks to which the transactions are directed. The transactions in each bank are also shown in chronological order in which the memory controller produced the transactions corresponding to incoming transaction requests, ranging from the oldest or least recently produced transaction to the newest or most recently produced transaction. In the illustrated example: the transactions in a first bank ("bank 0") consist of, in order from oldest to newest, a hit 802, a hit 804, and a conflict 806; the transactions in a second bank ("bank 1") consist of a conflict 808; the transactions in a third bank ("bank 2") consist of, in order from oldest to newest, two conflicts 810 and 812; the transactions in a fourth bank ("bank 3") consist of, in order from oldest to newest, two conflicts 814 and 816 and a hit 818; the transactions in a fifth bank ("bank 4") consist of, in order from oldest to newest, a conflict 820 and a hit-under-conflict 822 (i.e., a transaction initially identified as a conflict but that will become a hit as soon as the conflict 820 directed to the same row in the same bank activates it); the transactions in a sixth bank ("bank 5") consist of a hit 832 that the memory controller produced some time after having begun sending a subset to the DRAM; the transactions in a seventh bank ("bank 6") consist of, in order from oldest to newest, a miss 824 and a miss 826; the transactions in an eighth bank ("bank 7") consist of, in order from oldest to newest, a miss 828 and a hit-under-miss 830 (i.e., a transaction initially identified as a miss but that will become a hit as soon as the miss 828 directed to the same row in the same bank is completed).

A subset 834 (indicated in broken line in FIG. 8) to be sent to the DRAM may be formed by applying the above-described methods 400 (FIG. 4) and 500 (FIG. 5) to the transactions 802-830. In forming the subset 834, all the hits 802, 804, and 818 may be selected (in accordance with block 402 of FIG. 4). The hit 832 that may not have been present at the time the memory controller began sending the subset 832 to the DRAM may be added later (in accordance with block 414 of FIG. 4). Also, in forming the subset 832, the misses 824 and 828 in bank_6 and bank 7, respectively, may be selected (in accordance with block 404 of FIG. 4), as no hits were present to select in those banks. The conflicts 808, 810, and 820 in bank_1, bank 2, and bank 4, respectively, may be selected (in accordance with block 406 of FIG. 4), as no hits or misses were present to select in those banks. As the conflict 820 was selected, the hit-under-conflict 822 may also be selected (in accordance with block 408 of FIG. 4). Similarly, as the miss 828 was selected, the hit-under-miss 830 may also be selected (in accordance with block 408 of FIG. 4). Note in this example that transactions not in the subset 834 include the conflicts 806, 812, 814, 816 and the miss 826.

Figure 9:
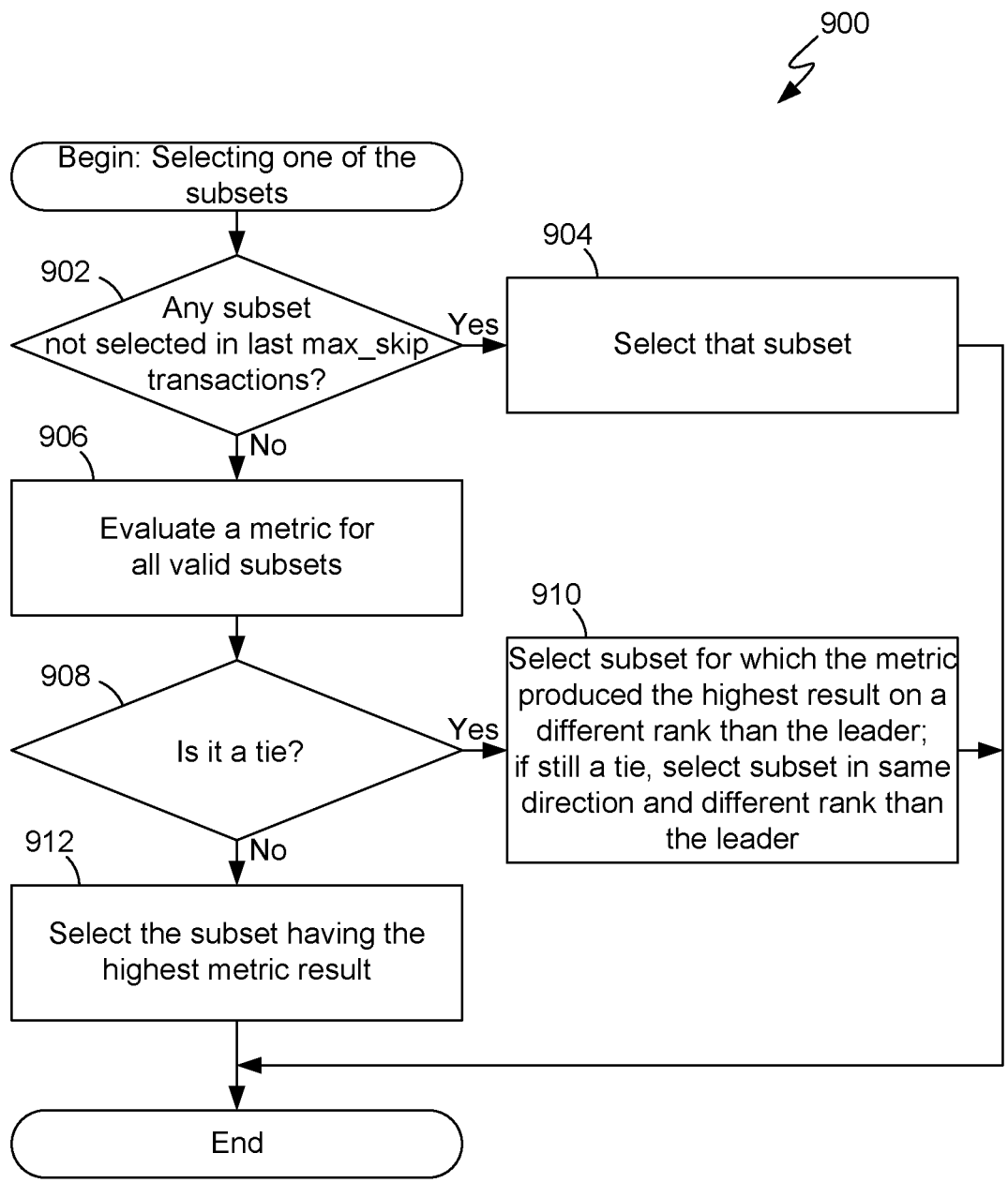
FIG. 9 is a flow diagram illustrating a method for selecting one of the subsets of transactions, in accordance with exemplary embodiments.

As illustrated in flow diagram form in FIG. 9, an exemplary method 900 for selecting which one of the four subsets to send to the DRAM may include the following. The method 900 may be an example of above-described block 306 of the method 300 (FIG. 3). Broadly, a subset may be selected based on a metric result produced by applying a metric to each of the subsets. In some embodiments, exceptions to selecting a subset based on a metric may be applied.

As indicated by block 902, it may be determined whether any of the subsets has not been selected within a threshold number ("max_skip") of the most recent transactions or most recent subsets to have been sent to the DRAM. If it is determined in block 902 that there is a subset that has not been selected within the threshold number of most recent transactions, then that subset may be selected, as indicated by block 904.

As indicated by block 906, if it is determined in block 902 that that there is no subset that has not been selected within the threshold number of most recent transactions, then a metric may be evaluated or calculated for each of the subsets. For example, in a dual-rank DRAM embodiment, a metric may be calculated for each of the four quadrant subsets, producing a corresponding metric result for each of the quadrants. Broadly described, the metric may be based on the benefit or efficiency gained by completing the number of transactions in a subset and may include an offset based on costs. Costs may include, for example, the cost in cycles of switching between subsets. As described below with regard to an example, the subsets may be evaluated using the method 900 while a subset is being sent to the DRAM. The subset whose data requests are being sent to the DRAM (i.e., by CAS commands) is the leader, and the subset selected using the method 900 to become the next leader once the then-current leader has finished sending its data requests to the DRAM is the follower. Note that the activate and the precharge commands of the leader and follower quadrants can be interleaved as long as the leader's execution order is not impacted. However, the CASes of the leader will always be scheduled ahead of the CASes of the follower. There is a cost associated with switching between ranks, and there is also a cost associated with switching the direction of data transfer (i.e., from reads to writes, or from writes to reads).

In defining metrics, benefits may be expressed in various ways, such as, for example: data cycles ("data_cycles(H,M,C,X)"), which represents the number of data cycles required to complete all of the hit ("H"), miss ("M"), conflict ("C"), and hit-under-miss/conflict ("X") transactions in the subset; bank spread ("bank spread"), which represents the number of unique banks traversed in completing the transactions in the subset; average bytes per page ("average_bytes_per_page(H,M,C,X)"), which represents the average number of bytes per page that would be accessed in completing all of the hit, miss, conflict, and hit-under-miss/conflict transactions in the subset; minimum burst length equivalent count ("minBL_equivalent_count(H,M,C,X)"), which is the number of minimum DRAM burst lengths that would be accessed in completing all of the hit, miss, conflict, and hit-under-miss/conflict transactions in the subset; transaction count ("transaction_count(H,M,C,X)"), which is the number of transactions in the subset; and others that may occur to one of ordinary skill in the art in view of the descriptions and examples set provided herein.

In defining metrics, costs may be expressed in various ways, such as, for example: switch cost in cycles ("switch_cost_in_cycles"), which represents the minimum delay to switch between subsets; same rank adder in cycles ("same_rank_adder_in_cycles"), which represents the inefficiency of sending transactions to the same banks as the leader subset from the subset under consideration; and others that may occur to one of ordinary skill in the art in view of the descriptions and examples set provided herein. Same_rank_adder_in_cycles may be defined as the difference between the cost of scheduling conflict transactions to the same banks as the leader subset and the benefit of overlapping data cycles from the transactions going to different banks than the leader subset. This is approximately equal to: Same_bank_conflict_cost−Diff_bank_data_cycles, where the Same_bank_conflict_cost is (tRD2PRE or tWR2PRE)+tRP+tRCD, and Diff_bank_data_cycles is the number of overlapping data cycles described above.

In defining metrics, the benefits and costs described above may be combined in various ways. A first example of a metric may be: data_cycles(H,M,C,X)−switch_cost_in_cycles. A second example of a metric may be: data_cycles(H,M,C,X)−switch_costin_cycles−same_rank_adder_in_cycles. A third example of a metric may be: bank spread×average_bytes_per_page(H,M,C,X). A fourth example of a metric may be: bank spread×average_bytes_per_page(H,M,C,X)−switch_cost_in_cycles. A fifth example of a metric may be: min_BL_equivalent_count (H,M,C,X). A sixth example of a metric may be: transaction_count(H.M,C,X). Still other metrics may occur to one of ordinary skill in the art in view of the foregoing descriptions and examples.

After a metric is applied to each of the subsets in block 906, it may be determined whether there was a tie, i.e., whether the metric evaluated to or produced the same result for two or more subsets, as indicated by block 908. If it is determined that the metric produced the same result for two or more subsets (i.e., there was a tie among two or more subsets), then the subset for which the metric produced the highest result on a different rank than the leader subset may be selected, as indicated by block 910. If there is still a tie among the two subsets on the different rank, then select the subset in the same direction and different rank than the leader subset. Otherwise (i.e., if the metric produced a result for one subset that is higher than the result the metric produced for the other subsets), the subset for which the metric produced the highest value may be selected, as indicated by block 912. Still other policies on using any of the above metrics may occur to one of ordinary skill in the art in view of the foregoing descriptions and examples.

Figure 10:
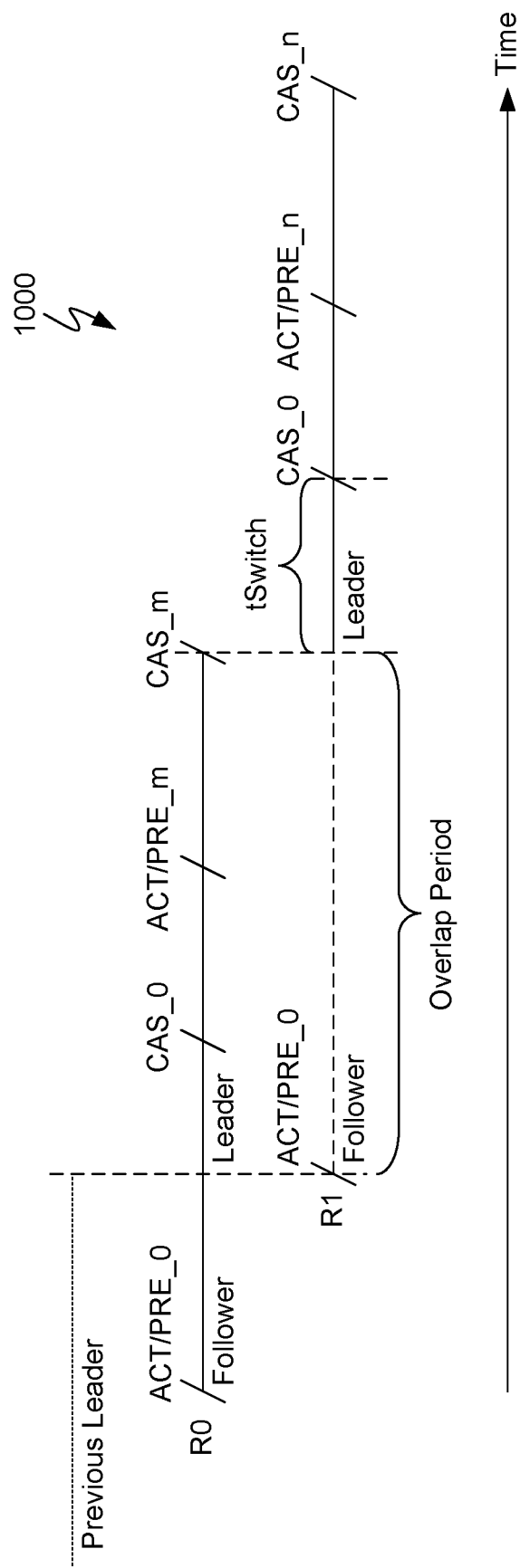
FIG. 10 is a timeline illustrating an overlap period between sending transactions from a leader subset and sending transactions from a follower subset, in accordance with exemplary embodiments.

As illustrated by the exemplary timeline 1000 in FIG. 10, there is an overlap period during which one of the subsets is the leader and the other is the follower. In, for example, a dual-rank DRAM embodiment, one of the quadrants (e.g., R0) is the leader quadrant while another of the quadrants (e.g., R1) is the follower quadrant. In this example, during the overlap period the memory controller is sending read and write (i.e., CAS), ACT, and PRE commands associated with the leader quadrant, and the memory controller is sending only ACT and PRE commands associated with the follower quadrant. After the last CAS ("CAS_m") associated with the leader quadrant is sent, the follower quadrant becomes the leader. As the memory controller already scheduled the ACT or PRE command for the quadrant that has become the leader, after tSwitch the memory controller may immediately begin sending CAS commands, beginning with a first CAS ("CAS_0") and ending with the last CAS ("CAS_n"). Thus, the costs associated with opening or closing a row (page) in one quadrant are efficiently overlapped with CAS commands on another quadrant.

Figure 11:
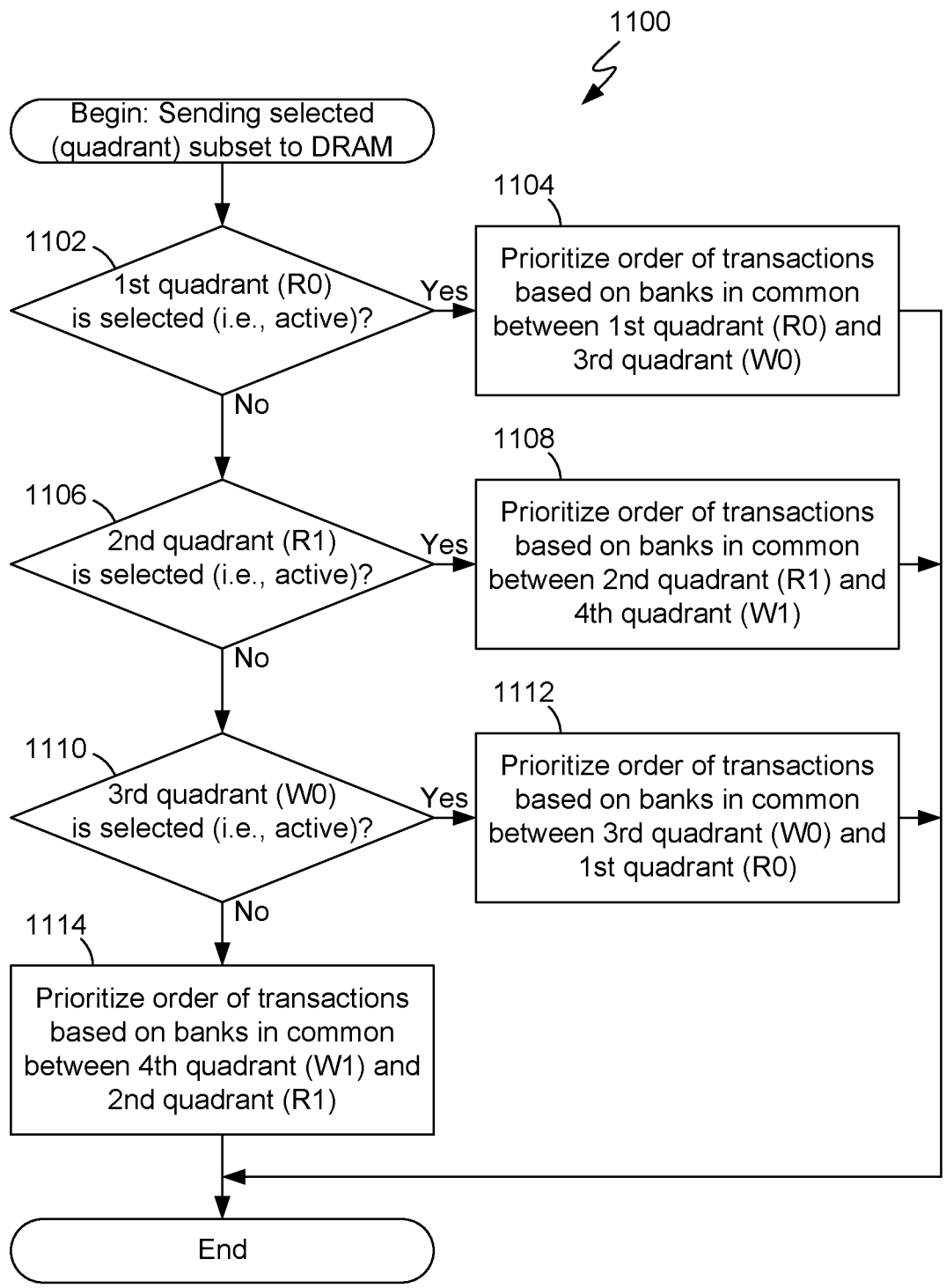
FIG. 11 is a flow diagram illustrating one aspect of a method for sending a selected subset to the DRAM, in accordance with exemplary embodiments.

As illustrated in flow diagram form in FIG. 11, a method 1100 for sending the transactions in the selected subset to the DRAM may include the following. The method 1100 may be an example of above-described block 308 of the method 300 (FIG. 3). The method 1100 also may be referred to as an example of intra-subset scheduling. As described above, when read or write commands (i.e., CAS commands) are being sent to the DRAM, the associated subset may be referred to as the leader. The method 1100 may determine an order or priority in which transactions in the leader subset are sent to the DRAM. Broadly, the order or priority in which transactions in the leader subset are sent to DRAM may be based on the transactions in another subset on the same rank (in the opposite transaction direction). For example, in a dual-rank embodiment in which there are four subsets or quadrants, R0, R1, W0 and W1: if R0 is the leader quadrant, the order or priority in which transactions in R0 are sent may be based on the transactions in W0; if R1 is the leader quadrant, the order or priority in which transactions in R1 are sent may be based on the transactions in W1; if W0 is the leader quadrant, the order or priority in which transactions in W0 are sent may be based on the transactions in R0; and if W1 is the leader quadrant, the order or priority in which transactions in W1 are sent may be based on the transactions in R1. The order or priority in which transactions in the leader quadrant are sent may be based on which banks those transactions have in common with the banks of the transactions in the other quadrant on the same rank.

Continuing this example involving four quadrants, if it is determined in block 1102 that the leader quadrant is the first quadrant (R0), then the order or priority in which its transactions are sent may be based on which banks those transactions have in common with the transactions in the third quadrant (W0), as indicated by block 1104. If it is determined in block 1106 that the leader quadrant is the second quadrant (R1), then the order or priority in which its transactions are sent may be based on which banks those transactions have in common with transactions in the fourth quadrant (W1), as indicated by block 1108. If it is determined in block 1110 that the leader quadrant is the third quadrant (W0), then the order or priority in which its transactions are sent may be based on which banks those transactions have in common with the transactions in the first quadrant (R0), as indicated by block 1112. If it is determined (by negative determinations in blocks 1102, 1106, and 1110) that the leader quadrant is the fourth quadrant (W1), then the order or priority in which its transactions are sent may be based on which banks those transactions have in common with the transactions in the first quadrant (R0), as indicated by block 1114.

Figure 12:
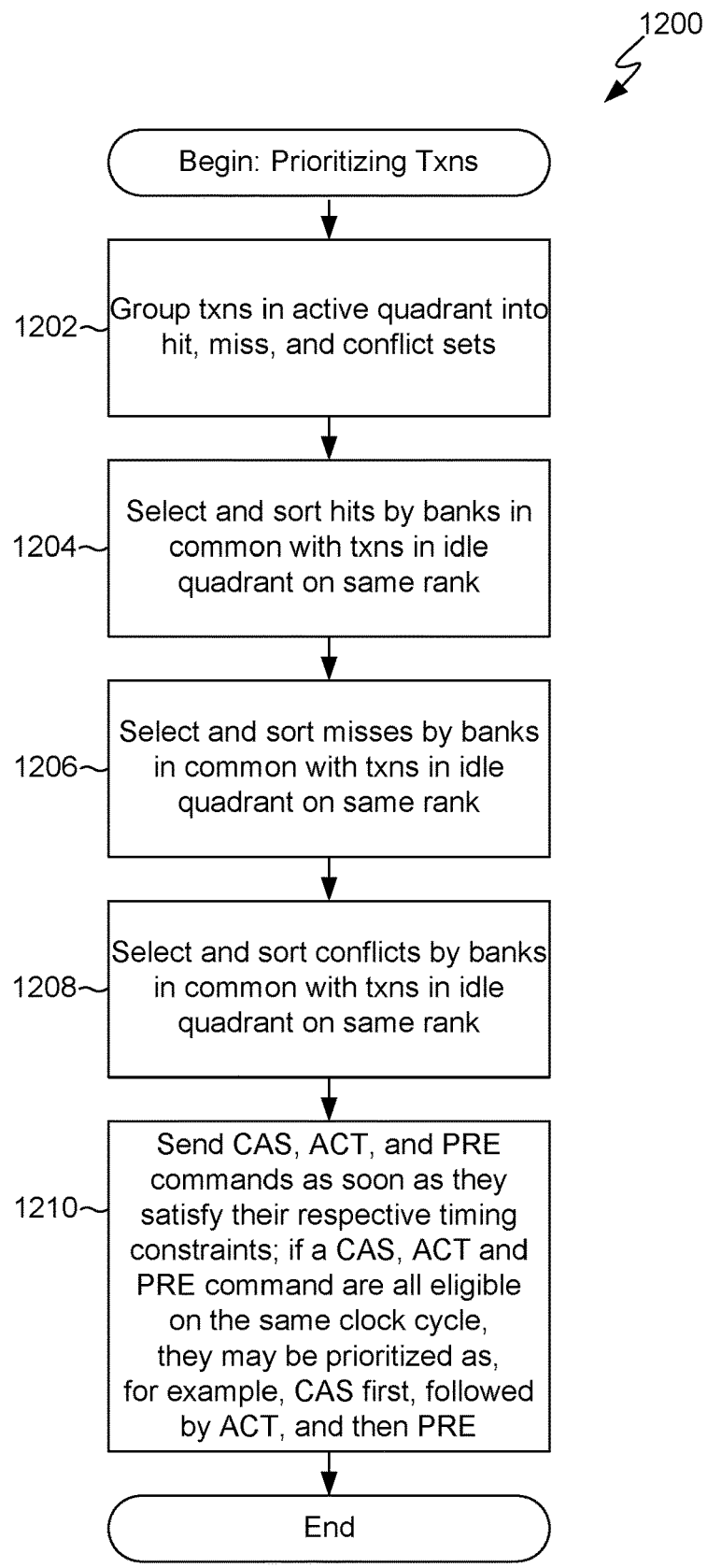
FIG. 12 is a flow diagram illustrating another aspect of the method for sending a selected subset to the DRAM, in accordance with exemplary embodiments.

As illustrated in flow diagram form in FIG. 12, a method 1200 for prioritizing the order in which the transactions in the leader subset (e.g., quadrant) are sent to the DRAM based on the banks in common with another subset (e.g., the other quadrant) on the same rank may include the following. The method 1200 may be an example of each of the above-described blocks 1104, 1108, 1112, and 1114 of the method 1100 (FIG. 11).

As indicated by block 1202, the transactions in the leader quadrant may be grouped into three sets: hit, miss, and conflict. As indicated by blocks 1204, 1206, and 1208, respectively, the hits, misses, and conflicts are then sorted by the banks they have in common with transactions in the other quadrant on same rank. "Sorted" means that the DRAM commands of the transaction to common banks are scheduled before DRAM commands of the transactions to different banks. If none of the hits, misses, or conflicts have any banks in common with the transactions in the other quadrant on the same rank, then they may be prioritized as, for example: all hits first, followed by all misses (including any hits-under-misses), and then all conflicts (including any hits-under-conflict).

As indicated by block 1210, CAS, ACT, and PRE commands may be sent to the DRAM as soon as they are eligible, i.e., satisfy their respective timing constraints. If a CAS, ACT, and PRE command are all eligible on the same clock cycle, they may be prioritized as, for example: CAS first, followed by ACT, and then PRE.

In an example of how the method 1200 may be applied, the leader quadrant may be R0, in which there may be a read directed to bank_0 and a read directed to bank_4. In this example, the other quadrant on the same rank is W0, which may have a write directed to bank_4 and a write directed to bank_5. Applying the method 1200, the read directed to bank_4 is sent before the read directed to bank_0 because bank_4 is a common bank between that transaction and the transactions in W0, and bank_0 is not a common bank between that transaction and the transactions in W0. This order of transactions results in the PRE/ACT for the write directed to bank_4 occurring in parallel with the with the CASes of the read transaction directed to bank 0, as soon as the read transaction directed to bank_4 is completed. In contrast, if the method 1200 were not applied, the read directed to bank_0 could be sent before the read directed to bank_4. If the transactions were sent in this order, the PRE/ACT associated with the write directed to bank_4 would occur only after the CASes associated with the read to bank 0 and read to bank 4.

Figure 13:
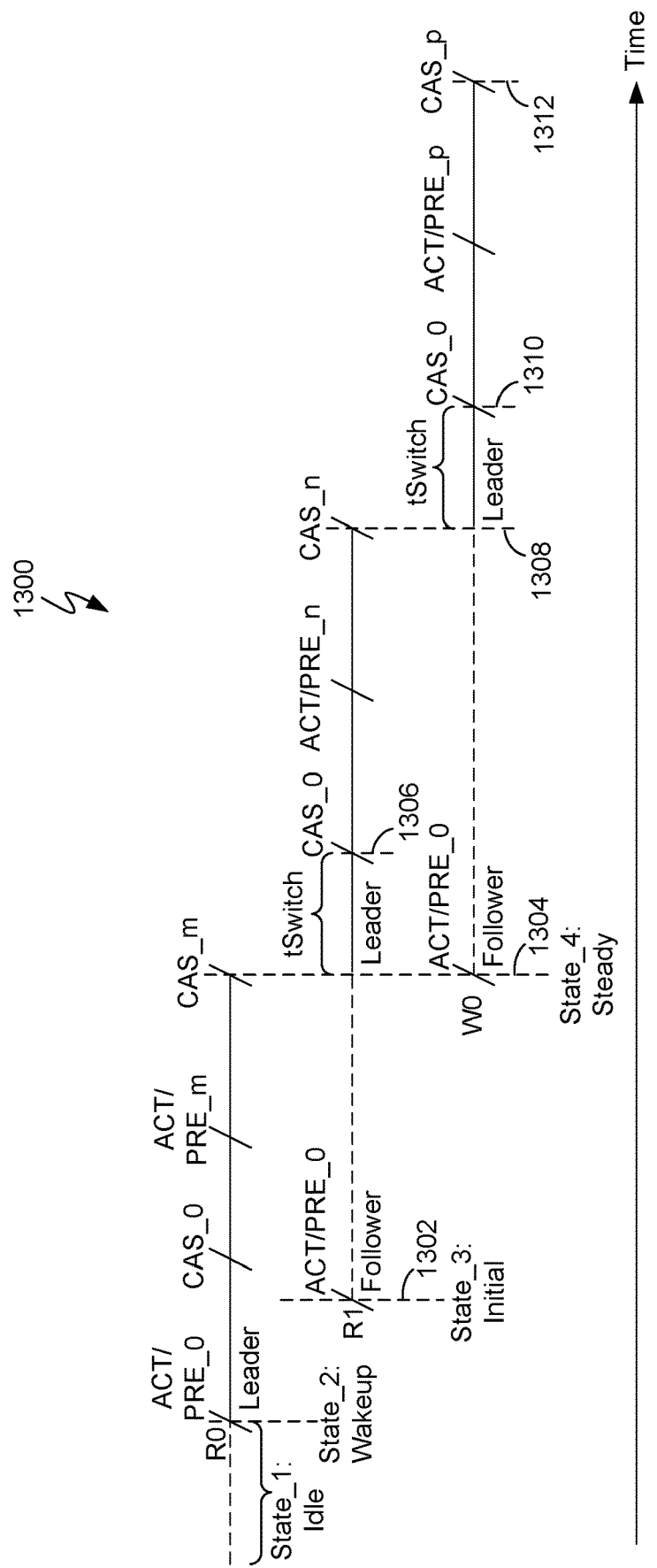
FIG. 13 is a timeline illustrating timing aspects of the method of FIG. 12, in accordance with exemplary embodiments.

As illustrated by the exemplary timeline 1300 in FIG. 13, between a time 1302 and a time 1304 one of the quadrants (e.g., R0) is the leader quadrant while another of the quadrants (e.g., R1) is the follower quadrant. This may be the initial state described above with regard to FIG. 2. Between time 1302 and time 1304, the memory controller may send reads (i.e., CAS), ACT, and PRE commands associated with R0, and the memory controller may send only ACT and PRE commands associated with R1. The last CAS ("CAS_m") associated with R0 is sent at time 1304. At time 1304, R1 becomes the leader quadrant. Also at time 1304, a quadrant (e.g., W0) determined by the above-described method 900 (FIG. 9) becomes the next follower quadrant. This may be the steady state described above with regard to FIG. 2. Beginning at a time 1306 that is tSwitch cycles after time 1304, the memory controller may send reads (i.e., CAS), ACT, and PRE commands associated with R1 as the new leader quadrant. The last CAS ("CAS_n") associated with R1 is sent at time 1308. Between time 1304 and time 1308, the memory controller may send only ACT and PRE commands associated with the W0 as the newly determined follower quadrant. At time 1308, W0 becomes the leader quadrant. Beginning at a time 1310 that is tSwitch cycles after time 1308, the memory controller may send writes (i.e., CAS), ACT, and PRE commands associated with W0 as the new leader quadrant. The last CAS ("CAS_p") associated with W0 is sent at time 1312. The pattern shown in FIG. 13 may repeat, with the memory controller selecting the next follower quadrant, and the quadrants switching between leader and follower roles each time the memory controller completes sending all selected transactions in the leader quadrant subset.

Figure 14:
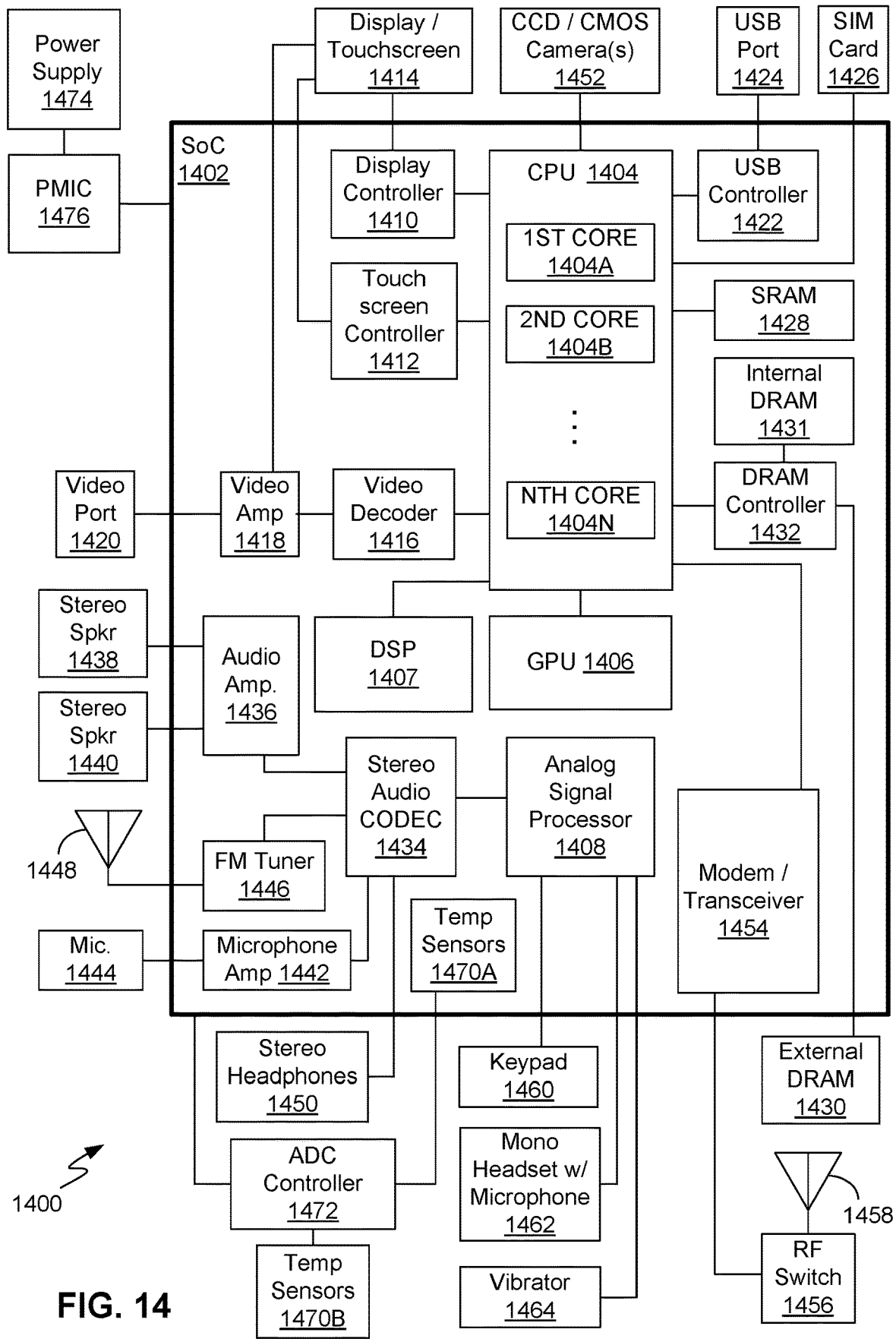
FIG. 14 is a block diagram of a computing device, in accordance with exemplary embodiments.

As illustrated in FIG. 14, exemplary embodiments of systems and methods for scheduling DRAM transactions may be provided in a portable computing device ("PCD") 1400. The PCD 1400 may be an example of the above-described computing device 100 (FIG. 1), which as stated above may be any kind of computing device.

The PCD 1400 may include an SoC 1402. The SoC 1402 may include a CPU 1404, a GPU 1406, a DSP 1407, an analog signal processor 1408, or other processors. The CPU 1404 may include multiple cores, such as a first core 1404A, a second core 1404B, etc., through an Nth core 1404N.

A display controller 1410 and a touch-screen controller 1412 may be coupled to the CPU 1404. A touchscreen display 1414 external to the SoC 1402 may be coupled to the display controller 1410 and the touch-screen controller 1412. The PCD 1400 may further include a video decoder 1416 coupled to the CPU 1404. A video amplifier 1418 may be coupled to the video decoder 1416 and the touchscreen display 1414. A video port 1420 may be coupled to the video amplifier 1418. A universal serial bus ("USB") controller 1422 may also be coupled to CPU 1404, and a USB port 1424 may be coupled to the USB controller 1422. A subscriber identity module ("SIM") card 1426 may also be coupled to the CPU 1404.

One or more memories may be coupled to the CPU 1404. The one or more memories may include both volatile and non-volatile memories. Examples of volatile memories include static random access memory ("SRAM") 1428 and dynamic RAMs ("DRAM"s) 1430 and 1431. Such memories may be external to the SoC 1402, such as the DRAM 1430, or internal to the SoC 1402, such as the DRAM 1431. A DRAM controller 1432 coupled to the CPU 1404 may control the writing of data to, and reading of data from, the DRAMs 1430 and 1431. In other embodiments, such a DRAM controller may be included within a processor, such as the CPU 1404. The DRAM controller 1432 may be an example of the memory controller 102 (FIG. 1) or 202 (FIG. 2). The DRAMs 1430 and 1431 may be examples of the DRAM 108 (FIG. 1) or 206 (FIG. 2).

A stereo audio CODEC 1434 may be coupled to the analog signal processor 1408. Further, an audio amplifier 1436 may be coupled to the stereo audio CODEC 1434. First and second stereo speakers 1438 and 1440, respectively, may be coupled to the audio amplifier 1436. In addition, a microphone amplifier 1442 may be coupled to the stereo audio CODEC 1434, and a microphone 1444 may be coupled to the microphone amplifier 1442. A frequency modulation ("FM") radio tuner 1446 may be coupled to the stereo audio CODEC 1434. An FM antenna 1448 may be coupled to the FM radio tuner 1446. Further, stereo headphones 1450 may be coupled to the stereo audio CODEC 1434. Other devices that may be coupled to the CPU 1404 include one or more digital (e.g., CCD or CMOS) cameras 1452.

A modem or RF transceiver 1454 may be coupled to the analog signal processor 1408. An RF switch 1456 may be coupled to the RF transceiver 1454 and an RF antenna 1458. In addition, a keypad 1460, a mono headset with a microphone 1462, and a vibrator device 1464 may be coupled to the analog signal processor 1408.

The SoC 1402 may have one or more internal or on-chip thermal sensors 1470A and may be coupled to one or more external or off-chip thermal sensors 1470B. An analog-to-digital converter ("ADC") controller 1472 may convert voltage drops produced by the thermal sensors 1470A and 1470B to digital signals. A power supply 1474 and a power management integrated circuit ("PMIC") 1476 may supply power to the SoC 1402.

Firmware or software may be stored in any of the above-described memories, such as DRAM 1430 or 1431, SRAM 1428, etc., or may be stored in a local memory directly accessible by the processor hardware on which the software or firmware executes. Execution of such firmware or software may control aspects of any of the above-described methods or configure aspects any of the above-described systems. Any such memory or other non-transitory storage medium having firmware or software stored therein in computer-readable form for execution by processor hardware may be an example of a "computer program product," "computer-readable medium," etc., as such terms are understood in the patent lexicon.

Alternative embodiments will become apparent to one of ordinary skill in the art to which the invention pertains without departing from its spirit and scope. Therefore, although selected aspects have been illustrated and described in detail, it will be understood that various substitutions and alterations may be made therein without departing from the spirit and scope of the present invention, as defined by the following claims.

What is claimed is:

1. A method for scheduling dynamic random access memory (DRAM) transactions in a computing device, comprising:
   determining, by a memory controller, a plurality of memory transactions corresponding to a plurality of transaction requests received from one or more processors, wherein determining the plurality of memory transactions comprises identifying each memory transaction as one of a read and a write and as directed to an identified one of a plurality of DRAM ranks;
   forming, by the memory controller, the plurality of memory transactions into a plurality of subsets, each subset comprising one or more memory transactions identified by a same combination of direction and DRAM rank as each other;
   selecting, by the memory controller, one of the subsets;
   sending, by the memory controller, all transactions in the selected one of the subsets to the DRAM; and
   wherein selecting one of the subsets comprises:
   calculating a metric for each of the subsets to produce corresponding metric results; and
   selecting the one of the subsets corresponding to a highest metric result.

2. The method of claim 1, wherein
determining the plurality of memory transactions comprises identifying each transaction as one of a hit, a miss, a conflict, and a hit-under-miss/conflict, each of a plurality of banks of the DRAM having zero or more of the memory transactions.

3. The method of claim 2, wherein forming the plurality of memory transactions into the plurality of subsets further comprises, for each of the subsets:
   selecting each transaction identified as a hit in a bank of the DRAM; and
   selecting each transaction identified as a miss in any bank of the DRAM in which no transaction identified as a hit is selected; and
   selecting each transaction identified as a conflict in any bank of the DRAM in which no transaction identified as a hit is selected and no transaction identified as a miss is selected.

4. The method of claim 3, wherein forming the plurality of memory transactions into the plurality of subsets further comprises, for each of the subsets:
   selecting each transaction identified as a hit-under-miss/conflict under each selected transaction identified as a miss and under each selected transaction identified as a conflict.

5. The method of claim 4, wherein forming the plurality of memory transactions into the plurality of subsets further comprises, for each of the subsets, discarding one or more selected transactions identified as a miss, a conflict, or a hit-under-miss/conflict if scheduling them would result in more than a threshold number of empty data bus cycles.

6. The method of claim 1, wherein the metric includes a benefit portion responsive to at least one of: a count of data cycles among all selected transactions in a subset; a bank spread among all selected transactions in the subset; an average number of bytes per page among all selected transactions in the subset; a minimum burst length equivalent count among all selected transactions in the subset; and a transaction count among all selected transactions in the subset.

7. The method of claim 1, wherein the metric includes a cost portion responsive to at least one of: a subset switch cost; and a same rank adder cost.

8. The method of claim 1, wherein sending all transactions in the selected one of the subsets to the DRAM comprises:
   determining a transaction order for the selected one of the subsets based on banks in common between the selected one of the subsets and another subset on a same rank as the selected one of the subsets; and sending the memory transactions in the selected one of the subsets to the DRAM in the determined transaction order.

9. The method of claim 1, wherein sending all transactions in the selected one of the subsets further comprises adding one or more transactions to the selected one of the subsets before a final column address select (CAS) command associated with the selected one of the subsets is sent to the DRAM.

10. A system for scheduling memory transactions in a computing device having a memory controller and a dynamic random access memory (DRAM), comprising:
a transaction queue in the memory controller; and
scheduling logic in the memory controller, the scheduling logic configured to:
determine a plurality of memory transactions corresponding to a plurality of transaction requests received from one or more processors, wherein each memory transaction is identified as one of a read and a write and as directed to an identified one of a plurality of DRAM ranks;
form the plurality of memory transactions into a plurality of subsets, each subset comprising one or more memory transactions identified by a same combination of direction and DRAM rank as each other;
select one of the subsets;
send all transactions in the selected subset to the DRAM via the transaction queue; and
wherein the scheduling logic is configured to select one of the subsets by being configured to:
calculate a metric for each of the subsets to produce corresponding metric results; and
select the one of the subsets corresponding to a highest metric result.

11. The system of claim 10, wherein:
the scheduling logic is configured to identify each transaction as one of a hit, a miss, a conflict, and a hit-under-miss/conflict, each of a plurality of banks of the DRAM having zero or more of the memory transactions.

12. The system of claim 11, wherein the scheduling logic is configured to form the plurality of memory transactions into the plurality of subsets by further being configured to, for each of the subsets:
select each transaction identified as a hit in a bank of the DRAM; and
select each transaction identified as a miss in any bank of the DRAM in which no transaction identified as a hit is selected; and
select each transaction identified as a conflict in any bank of the DRAM in which no transaction identified as a hit is selected and no transaction identified as a miss is selected.

13. The system of claim 12, wherein the scheduling logic is configured to form the plurality of memory transactions into the plurality of subsets by being further configured to, for each of the subsets:
select each transaction identified as a hit-under-miss/conflict under each selected transaction identified as a miss and under each selected transaction identified as a conflict.

14. The system of claim 13, wherein the scheduling logic is configured to form the plurality of memory transactions into the plurality of subsets by being further configured to, for each of the subsets, discard one or more selected transactions identified as a miss, a conflict, or a hit-under-miss/conflict, if scheduling them would result in more than a threshold number of empty data bus cycles.

15. The system of claim 10, wherein the metric includes a benefit portion responsive to at least one of: a count of data cycles among all selected transactions in a subset; a bank spread among all selected transactions in the subset; an average number of bytes per page among all selected transactions in the subset; a minimum burst length equivalent count among all selected transactions in the subset; and a transaction count among all selected transactions in the subset.

16. The system of claim 10, wherein the metric includes a cost portion responsive to at least one of: a subset switch cost; and a same rank adder cost.

17. The system of claim 10, wherein the scheduling logic is configured to send all transactions in the selected one of the subset to the DRAM by being configured to:
determine a transaction order for the selected one of the subsets, based on banks in common between the selected one of the subsets and another subset on a same rank as the selected one of the subsets; and
send the memory transactions in the selected one of the subsets to the DRAM in the determined transaction order.

18. The system of claim 10, wherein the scheduling logic is configured to send all transactions in the selected one of the subsets to the DRAM by being further configured to add one or more transactions to the selected one of the subsets before a final column address select (CAS) command associated with the selected one of the subsets is sent to the DRAM.

19. A system for scheduling dynamic random access memory (DRAM) transactions in a computing device, comprising:
means for determining a plurality of memory transactions corresponding to a plurality of transaction requests received from one or more processors, wherein the means for determining a plurality of memory transactions identifies each memory transaction as one of a read and a write and as directed to an identified one of a plurality of DRAM ranks;
means for forming the plurality of memory transactions into a plurality of subsets, each subset comprising memory transactions identified by a same combination of direction and DRAM rank as each other;
means for selecting one of the subsets;
means for sending all transactions in the selected one of the subsets to the DRAM; and
wherein the means for selecting one of the subsets comprises:
means for calculating a metric for each subset to produce corresponding metric results; and
means for selecting the one of the subsets corresponding to a highest metric result.

20. The system of claim 19, wherein:
the means for determining the plurality of memory transactions comprises means for identifying each transaction as one of a hit, a miss, a conflict, and a hit-under-miss/conflict, each of a plurality of banks of the DRAM having zero or more of the memory transactions.

21. The system of claim 20, wherein the means for forming the plurality of memory transactions into the plurality of subsets comprises, for each of the subsets:
means for selecting each transaction identified as a hit in a bank of the DRAM means for selecting each transaction identified as a miss in any bank of the DRAM in which no transaction identified as a hit is selected; and means for selecting each transaction identified as a conflict in any bank of the DRAM in which no transaction identified as a hit is selected and no transaction identified as a miss is selected.

22. The system of claim 21, wherein the means for forming the plurality of memory transactions into the plurality of subsets further comprises, for each of the subsets:
means for selecting each transaction identified as a hit-under-miss/conflict under each selected transaction identified as a miss and under each selected transaction identified as a conflict.

23. The system of claim 22, wherein the means for forming the plurality of memory transactions into the plurality of subsets further comprises, for each of the subsets, means for discarding one or more selected transactions identified as a miss, a conflict, or a hit-under-miss/conflict, if scheduling them would result in more than a threshold number of empty data bus cycles.

24. The system of claim 19, wherein:
the metric includes a benefit portion responsive to at least one of: a count of data cycles among all selected transactions in a subset; a bank spread among all selected transactions in the subset; an average number of bytes per page among all selected transactions in the subset; a minimum burst length equivalent count among all selected transactions in the subset; and a transaction count among all selected transactions in the subset; and
the metric includes a cost portion responsive to at least one of: a subset switch cost; and a same rank adder cost.

25. The system of claim 19, wherein the means for sending all transactions in the selected one of the subsets to the DRAM comprises:
means for determining a transaction order for the selected one of the first, second, third, and fourth subsets based on banks in common between the selected one of the subsets and another subset on a same rank as the selected one of the subsets; and
the means for sending the memory transactions in the selected one of the subsets sends the memory transactions to the DRAM in the determined transaction order.

26. The system of claim 19, wherein the means for sending all transactions in the selected one of the subsets further comprises means for adding one or more transactions to the selected one of the subsets before a final column address select (CAS) command associated with the selected one of the subsets is sent to the DRAM.

27. A computer program product for scheduling dynamic random access memory (DRAM) transactions in a computing device having a memory controller, the computer program product comprising a non-transitory computer-readable medium having stored thereon in computer-executable form instructions that when executed by a processing system of the memory controller configure the memory controller to:
determine a plurality of memory transactions corresponding to a plurality of transaction requests received from one or more processors, wherein each memory transaction is identified as one of a read and a write and as directed to an identified one of a plurality of DRAM ranks;
form the plurality of memory transactions into a plurality of subsets, each subset comprising memory transactions identified by a same combination of direction and DRAM rank as each other;
select one of the subsets by:
calculating a metric for each of the subsets to produce corresponding metric results; and
selecting the one of the subsets corresponding to a highest metric result; and
send all transactions in the selected one of the subsets to the DRAM.

28. The computer program product of claim 27, wherein:
the instructions configure the memory controller to identify each transaction as one of a hit, a miss, a conflict, and a hit-under-miss/conflict, each of a plurality of banks of the DRAM having zero or more of the memory transactions.

29. The computer program product of claim 28, wherein:
the instructions configure the memory controller to form the plurality of memory transactions into the plurality of subsets by configuring the memory controller to, for each of the subsets:
select each transaction identified as a hit in a bank of the DRAM;
select each transaction identified as a miss in any bank of the DRAM in which no transaction identified as a hit is selected; and
select each transaction identified as a conflict in any bank of the DRAM in which no transaction identified as a hit is selected and no transaction identified as a miss is selected.

30. The computer program product of claim 29, wherein the instructions configure the memory controller to form the plurality of memory transactions into the plurality of subsets by further configuring the memory controller to, for each of the subsets:
select each transaction identified as a hit-under-miss/conflict under each selected transaction identified as a miss and under each selected transaction identified as a conflict.

31. The computer program product of claim 30, wherein the instructions configure the memory controller to form the plurality of memory transactions into the plurality of subsets by further configuring the memory controller to, for each of the subsets, discard one or more selected transactions identified as a miss, a conflict, or a hit-under-miss/conflict, if scheduling them would result in more than a threshold number of empty data bus cycles.

32. The computer program product of claim 27, wherein:
the metric includes a benefit portion responsive to at least one of: a count of data cycles among all selected transactions in a subset; a bank spread among all selected transactions in the subset; an average number of bytes per page among all selected transactions in the subset; a minimum burst length equivalent count among all selected transactions in the subset; and a transaction count among all selected transactions in the subset; and
the metric includes a cost portion responsive to at least one of: a quadrant switch cost; and a same rank adder cost.

33. The computer program product of claim 27, wherein the instructions configure the memory controller to send all transactions in the selected one of the subsets to the DRAM by being configuring the memory controller to:
determine a transaction order for the selected one of the subsets based on banks in common between the selected one of the subsets and another subset on a same rank as the selected one of the subsets; and send the memory transactions in the selected one of the
subsets to the DRAM in the determined transaction
order.

34. The computer program product of claim 27, wherein the instructions configure the memory controller to send all transactions in the selected one of the subsets to the DRAM by further configuring the memory controller to add one or more transactions to the selected one of the subsets before a final column address select (CAS) command associated with the selected one of the subsets is sent to the DRAM.

* * * * *